US007426265B2

(12) United States Patent
Chen et al.

(10) Patent No.: US 7,426,265 B2
(45) Date of Patent: Sep. 16, 2008

(54) SYSTEM AND METHOD FOR GENERALIZED CALL FORWARDING BETWEEN TELEPHONE TERMINALS

(75) Inventors: Kuo-Wei H. Chen, Scotch Plains, NJ (US); Oliver Haase, Fair Haven, NJ (US); Jonathan Michael Lennox, Jersey City, NJ (US); Kazutaka Murakami, Freehold, NJ (US); Ming Xiong, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 753 days.

(21) Appl. No.: 10/600,380

(22) Filed: Jun. 19, 2003

(65) Prior Publication Data

US 2004/0247107 A1 Dec. 9, 2004

Related U.S. Application Data

(63) Continuation-in-part of application No. 10/454,562, filed on Jun. 4, 2003.

(51) Int. Cl.
*H04M 3/42* (2006.01)
*H04M 7/00* (2006.01)
(52) U.S. Cl. ............................ 379/211.02; 379/212.01; 379/219; 379/220.01; 379/221.14
(58) Field of Classification Search ............ 379/211.02, 379/202.01, 219, 229, 221.14, 220.01, 212.01; 370/352, 401, 395.2, 353; 455/555
See application file for complete search history.

(56) References Cited

U.S. PATENT DOCUMENTS 5,517,564 A * 5/1996 Slater et al. ................. 379/229

| 6,185,288 | B1 * | 2/2001 | Wong ........................ 379/219 |
| 6,320,952 | B1 * | 11/2001 | Bruno et al. ........... 379/211.02 |
| 6,765,912 | B1 * | 7/2004 | Vuong ..................... 370/395.2 |
| 7,027,433 | B2 * | 4/2006 | Tuohino et al. ............. 370/352 |
| 7,027,577 | B2 * | 4/2006 | Gourraud et al. ....... 379/202.01 |
| 2001/0005372 | A1 * | 6/2001 | Cave et al. .................. 370/401 |
| 2002/0019246 | A1 * | 2/2002 | Forte .......................... 455/555 |
| 2003/0169729 | A1 * | 9/2003 | Bienn et al. ................. 370/353 |

OTHER PUBLICATIONS

Isukapalli et al: "Global Roaming and Personal Mobility with COPS Architecture in SuperDHLR," Bell Labs Technical Journal 7(2), 3-18 (2000).

* cited by examiner

*Primary Examiner*—Thjuan K Addy

(57) ABSTRACT

The call forwarding is provided within and between telephone networks by establishing a generalized procedure for call delivery and call forwarding. Network protocols are addressed using a common framework for processing call delivery and call forwarding among any combination of different types of networks. An "integrated location management" component realizes the generalized procedure. The integrated location management component is a device capable of holding location information for diverse cellular networks, including Internet telephony systems. The inventive system and method executes generalized call delivery and call forwarding for calls among different types of telephone networks, including wireless networks and Internet networks. The calls may originate from any type of telephony network. Having been initially directed to any of these networks, calls can then be call forwarded to any of these networks.

16 Claims, 27 Drawing Sheets

SYSTEM AND METHOD FOR GENERALIZED CALL FORWARDING BETWEEN TELEPHONE TERMINALS

CROSS REFERENCE TO RELATED APPLICATIONS

This application is a continuation-in-part of U.S. application Ser. No. 10/454,562 filed by the present inventors on Jun. 4, 2003 and entitled "A System And Method For Generalized Call Forwarding Between Telephone Terminals".

FIELD OF THE INVENTION

This invention relates to a system and method for call forwarding between telephone terminals on a plurality of telephone networks, such as public, cellular, and Internet telephone networks, and in particular for call forwarding between networks using different protocols.

BACKGROUND OF THE INVENTION

Call delivery is the process by which a call is placed to a telephone subscriber. When a call is placed to a subscriber's telephone number or address, the telephone system automatically delivers the call to the subscriber's registered terminal. Terminal is a term of art that reflects the growing number of devices that can be connected to a telephone network. The cellular telephone, or cell phone, is one example of a terminal.

Many different types of telephone networks can execute call delivery, a function once done exclusively by traditional hard-wired (landline) networks. Typical of such different types of telephone networks include cellular telephone networks and Internet-based telephone networks. Internet telephony is one of the newest forms of telephone networking. In Internet telephony, calls are converted to digital signals according to protocols and standards that are suitable for connecting terminals and completing telephone calls via connections to the Internet. Various industry standards and terms of art have evolved to describe the different networks and methods of call delivery. The glossary found at the end of the specification defines many of these terms.

Call Forwarding is a standard service in telephone networks. A subscriber tells her service provider that, under certain conditions, if a call cannot be successfully placed to her terminal, it should instead be forwarded to another location. For example, a user could ask that her calls be forwarded to a co-worker when her cellular phone is busy. Most wireline, wireless and Internet telephone networks have mechanisms that are designed to provide these services. They work adequately when the originating system, the user's current terminal, and the destination terminal are all in the same network. However, they do not work as well when calls are being inter-worked, that is, connected between different types of networks that use different protocols for call forwarding. For example, call forwarding generally does not work when a call is placed using one system, the user is roaming in a second and the forwarded-to number is located in a third network.

Accordingly, there is a need for a generalized method and system to seamlessly and reliably complete call forwarding connections across a plurality of networks of differing types including traditional wireline networks, wireless networks, and the ever-growing number of Internet-based telephone networks.

SUMMARY OF THE INVENTION

The system and method provides call forwarding within and among telephone networks by establishing a generalized procedure for call delivery and call forwarding. Network protocols are addressed using a common framework for processing call delivery and call forwarding among any combination of different types of networks. An "integrated location management" component realizes the generalized procedure. The integrated location management component is a device capable of holding location information for diverse networks, including Internet telephony systems. For cellular networks, the integrated location management component acts as a traditional registrar of network-based subscriber profile information, or as the home location registrar (HLR). For an Internet telephony network, it is responsible for user and terminal registration.

The inventive system and method executes generalized call delivery and call forwarding for calls among different types of telephone networks, including wireless networks and Internet networks. The calls may originate from a wireline circuit switched network, a wireless circuit switched network (such as, GSM, UMTS, or CDMA2000) or an Internet telephony network (such as an SIP or H.323 network). Having been initially directed to any of these networks, calls can then be call forwarded to any of these networks, or to the Public Switched Telephone Network (PSTN).

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

Steps of flow in the various examples of call delivery, including call forwarding scenarios, are shown by the column of numbers on the left side of each block diagram. Numbered items in the disclosure and drawings, such as "200 OK," refer to telephone network terms of art as labels. They should not be read as traditional element labels in the figures.

It is to be understood that the drawings are for the purpose of illustrating the concepts of the invention, and except for any graphs, are not to scale. It is also understood that all application code, other framework code, database programs and data reside on computer readable media and run on one or more computer systems including standard computer components and operating systems as known in the art.

DESCRIPTION

This application is divided into two parts. Part I introduces the method for call forwarding between different types of networks, in terms of generic Network A, Network B, and Network C. Part II provides exemplary scenarios of call forwarding by the inventive method for various combinations of specific types of networks for those skilled in the art.

Figure 1:
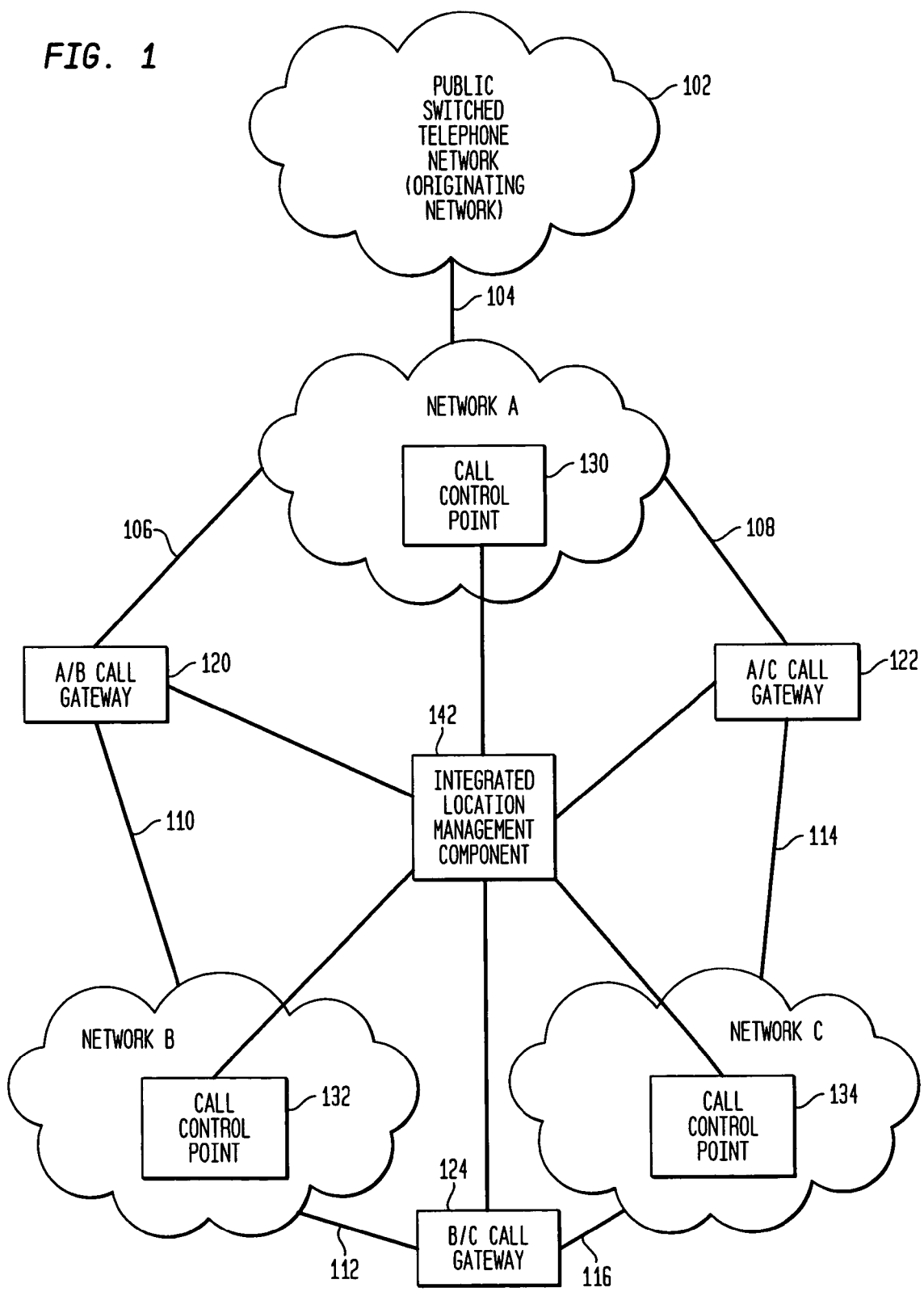
FIG. 1 illustrates a plurality of different types of networks interconnected by gateways in which an exemplary embodiment of this invention is implemented to provide call forwarding among the diverse networks.

Part I:

Generalized Call Delivery and Call Forwarding for Inter-Working Among Networks Utilizing Diverse Protocols FIG. 1 illustrates a plurality of networks in which a method and system for generalized call delivery and call forwarding according to an exemplary embodiment of this invention may be implemented. In the following description of a generalized process according to this exemplary embodiment, there are three networks of main interest:

Network A: Network A is the network to which the call was initially placed. The subscriber's publicly visible address (telephone number or URI) is registered or otherwise identified as being associated with Network A.

Network B: Network B is the network in which the user is currently located. The call is initially directed to this network, but this call setup attempt fails, causing the call forwarding procedure to be invoked.

Network C: Network C is the network to which the call is forwarded.

Networks A, B and C comprise any of a circuit-switched wireline network, a circuit-switched mobile telephony network (e.g. GSM, UMTS, CDMA, or CDMA2000) or an Internet telephony network (e.g. SIP or H.323). While Network A is illustrated as being connected to the Public Switched Telephone Network (PSTN) 102, one skilled in the art appreciates that PSTN 102 may be connected to any or all of Network A, Network B and Network C. Further, one skilled in the art appreciates that one or more of Network A, Network B and Network C may comprise part of PSTN 102. While PSTN 102 is illustrated as the originating network, any of the illustrated networks A, B and C may comprise the originating network.

As is known in the art, each network is connected to the other via lines, trunks, or both or via one or more data communication networks. The term "trunks" is used herein to mean all of these network connections. For purposes of describing FIG. 1, PSTN 102 is connected to Network A via trunks 104, Network A is connected to Network B via trunks 106 and to Network C via trunks 108. Network B is connected to Network A via trunks 110 and to Network C via trunks 112. Network C is connected to Network A via trunks 114 and to Network B via trunks 116.

According to this embodiment of this invention, each network interfaces to another network at a Call Gateway. A Call Gateway (CG) translates call signaling and voice traffic to and from a format (standard) utilized by one network from and to (respectively) a format (standard) utilized by the other network. For example, a SIP/PSTN gateway originates and terminates SIP call signaling and VoIP voice traffic on one side, and receives and sends ISUP call signaling and circuit-trunked voice traffic on the other side. In this exemplary embodiment, A/B CG 120 is the interface between Network A and Network B, A/C CG 122 is the interface between Network A and Network C and B/C CG 124 is the interface between Network B and Network C.

Further in accordance with this exemplary embodiment of this invention, each of Network A, Network B and Network C includes a Call Control Point. A Call Control Point (CCP) is a device that controls address resolution and call setup in its respective network. For example, in a wireless network the CCP comprises one or more Mobile Switching Centers. In a VoIP network, the CCP comprises a Proxy Server or a gatekeeper. In this exemplary embodiment, Network A includes CCP 130, Network B includes CCP 132 and Network C includes CCP 134

FIG. 1 includes an Integrated Location Management Component (ILMC) 142. ILMC 142 coordinates call forwarding in accordance with the exemplary embodiment of this invention. ILMC 142 operates under a common framework; that is, messages to and from all networks are handled under a standard set of actions irrespective of the connecting network's native protocol. ILMC 142 comprises a processor running a database protocol. In this regard, ILMC 142 is similar in construction and nature to a Home Location Register (HLR) as is known in the art of wireless telephony. One skilled in the art will understand how to build an ILMC 142 in accordance with this invention after studying this disclosure.

While the exemplary embodiment of FIG. 1 illustrates separate CCP's 130, 132 and 134, CG's 120, 122, 124 and the like, not all of these components need to be distinct entities. In actual networks, some components may be logically integrated into a single device. Other components or devices may be unnecessary. Different types of networks integrate and/or omit components as needed for that network and applicable standard governing the operation of the network. Further, the exemplary embodiment of FIG. 1 illustrates one CG 120, 122, 124 per interface between networks. One skilled in the art will appreciate that there are usually a plurality of CG's per interface. The generalized approach presented in Part I describes all the devices in the broad terms.

Figure 2:
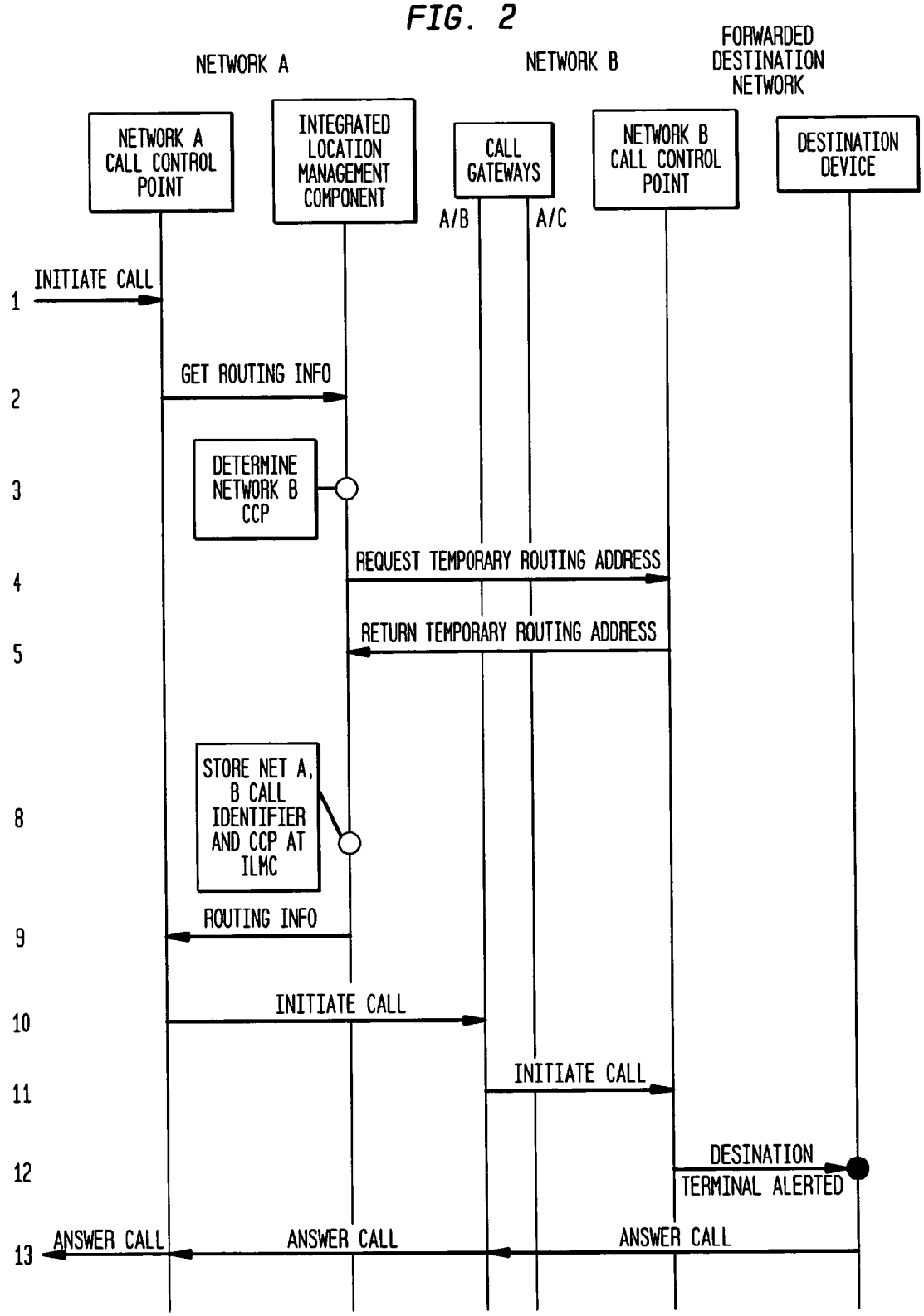
FIG. 2 is a simplified block diagram showing the general call delivery flow.

Call Delivery:

Turing now to FIG. 2, a call flow diagram is shown that describes in general terms the steps for inter-protocol call delivery. For purposes of describing the exemplary embodiment of this invention and a sampling of specific implementations, the column of numbers along the left side of the flow diagram of FIG. 2 and subsequent figures corresponds to the numbered steps.

1. A call is routed to a Network A Call Control Point, based on the subscriber's public address.

2. The Network A Call Control Point consults the Integrated Location Management Component to obtain a temporary routing number for the subscriber. This request includes a Network A Call Identifier identifying the call.

3. The ILMC determines the network or networks in which the user is currently located. For the purpose of this description, assume the user has only a single registered location. The ILMC determines the Network B Call Control Point that can reach the subscriber's terminal.

4. The Integrated Location Management Component requests a temporary routing address for the user from the Network B Call Control Point. If the Network B protocol normally includes an indication of the originating Call Control Point, the Integrated Location Management Component's request includes an indication that the ILMC itself should be treated as the originating Call Control Point for the purposes of call forwarding. This request includes a Network B Call Identifier identifying the call.

If necessary, the ILMC determines an appropriate Network A/Network B Gateway for the call, given the Network A Call Control Point, the Network B Call Control Point, and other information about the call. The process of determining which gateways are most appropriate, for the specific case of calls originating in circuit-switched networks and terminating in packet-switched networks, or vice-versa, is described in U.S. patent application Ser. No. 10/055,333, Apparatus And Method For Enabling Optimized Gateway Selection For Inter-Working Between Circuit-Switched And Internet Telephony, filed Jan. 23, 2002, which is incorporated herein by reference in its entirety.

In some cases, the ILMC requests a temporary routing number to the Network A/B Gateway instead of through the Network B Call Control Point, wherein the destination information is also sent to the gateway.

5. The Network B Call Control Point returns a temporary routing address.

6. Used in other scenarios.

7. Used in other scenarios.

8. If the subscriber has a call-forwarding feature enabled, the ILMC locally stores information correlating the Network A and Network B Call Identifiers, and the identity of the Network A Call Control Point. The use of this information is described in more detail in the sections below describing call forwarding.

9. The ILMC returns the temporary routing number to the Network A Call Control Point.

10. The Network A Call Control Point extends its call to the Network A/Network B gateway.

11. The Network A/Network B gateway extends its call to the Network B Call Control Point.

12. The Network B Call Control Point causes the destination terminal to be alerted.

13. For the purposes of illustration, assume that the destination terminal accepts the call. The call is completed, traversing the Network A Call Control Point, the Network A/Network B Gateway, and the Network B Call Control Point.

Figure 3A:
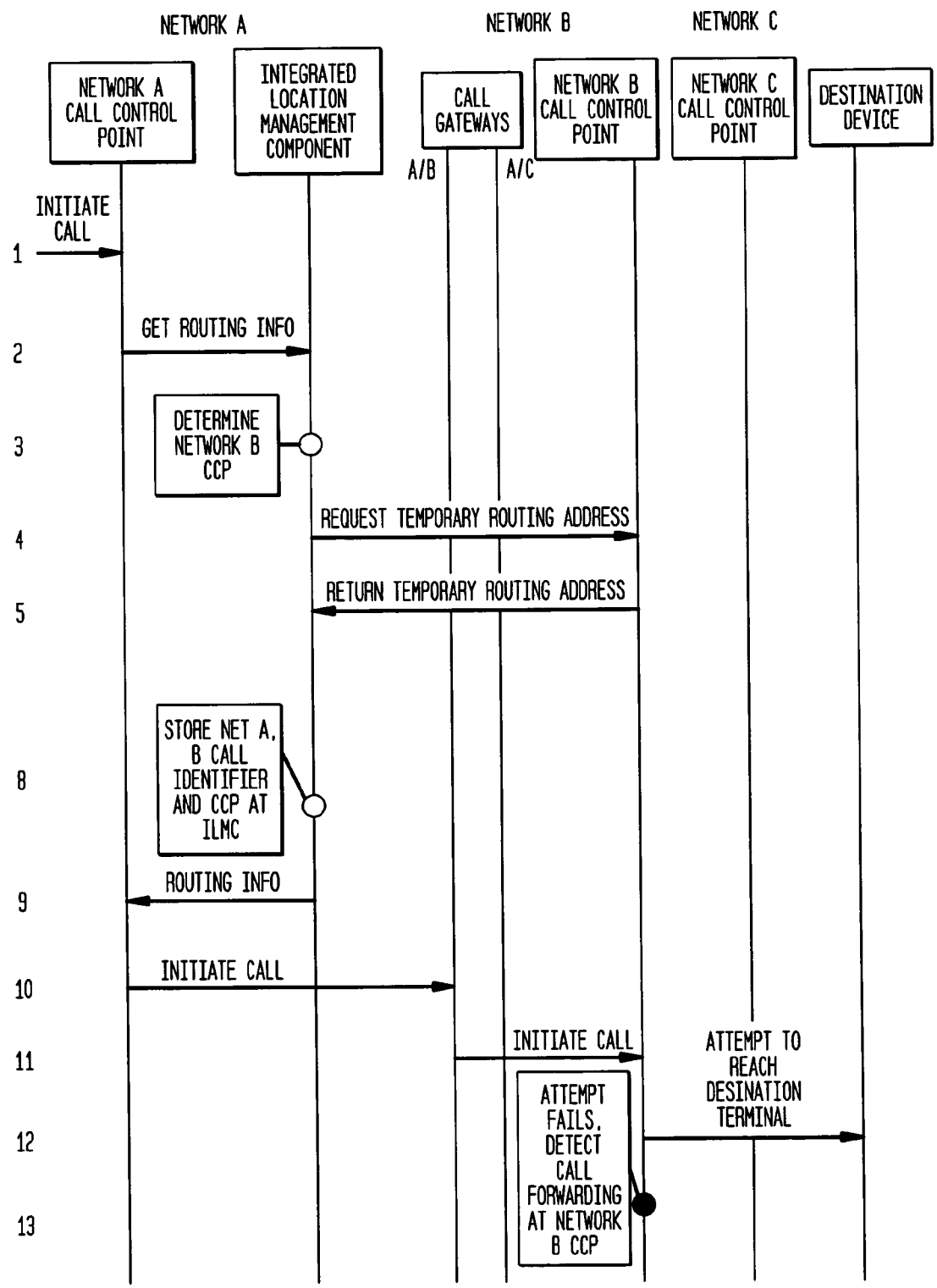
FIGS. 3A and 3B are simplified block diagrams showing the call forwarding flow where network A does the forwarding.
Figure 3B:
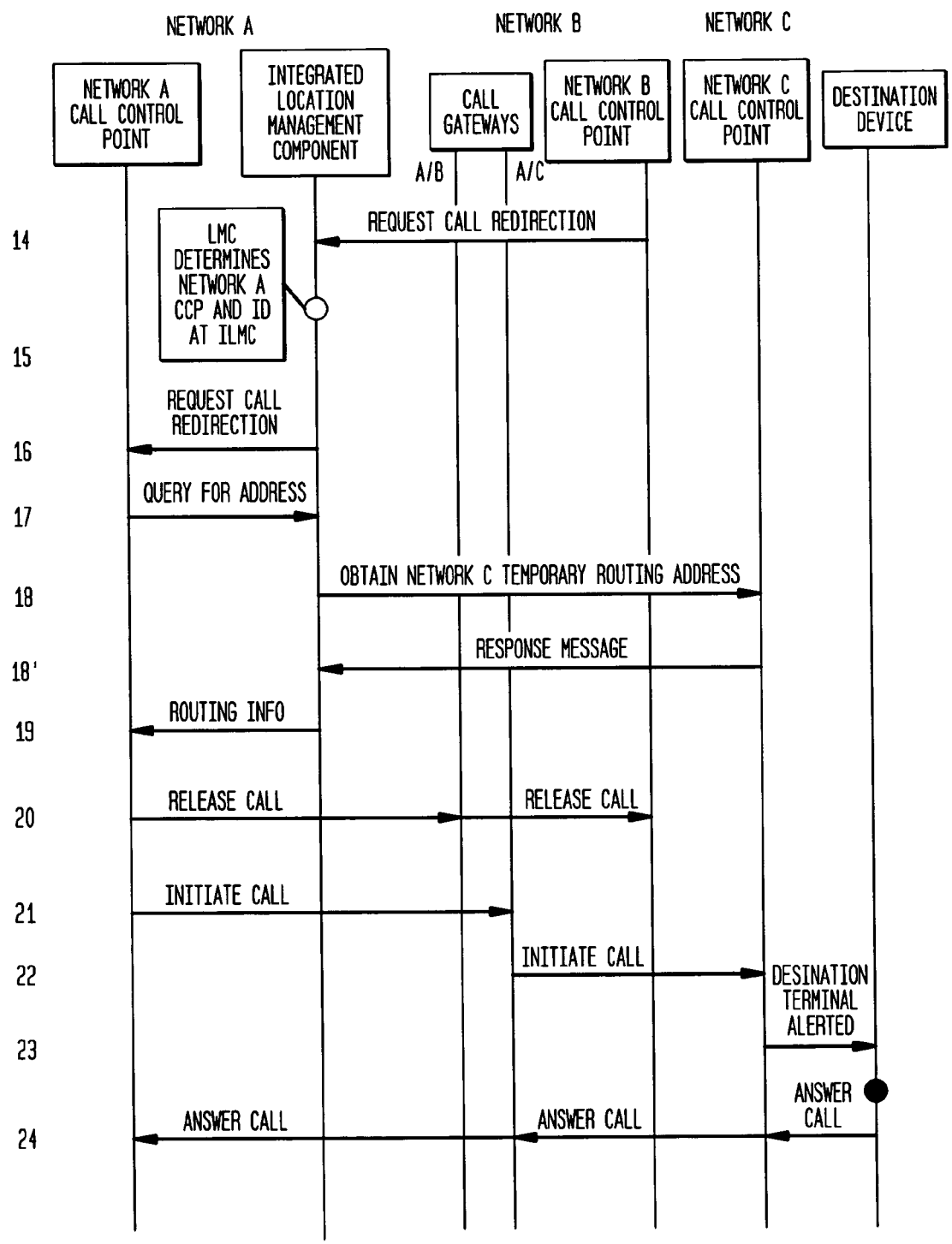

Call Forwarding by Network A: The scenario of FIGS. 3A and 3B describe the steps that occur for inter-protocol call forwarding, when the forwarding process is performed in Network A. FIG. 3B is a continuation of the call flow of FIG. 3A.

1. A call is routed to a Network A Call Control Point, based on the subscriber's public address.

2. The Network A Call Control Point consults the ILMC to obtain a temporary routing number for the subscriber. This request includes a Network A Call Identifier identifying the call.

3. The ILMC determines the network or networks in which the user is currently located. For the purpose of this description, assume the user has only a single registered location. The ILMC determines the Network B Call Control Point that can reach the subscriber's terminal.

4. The ILMC requests a temporary routing address for the user from the Network B Call Control Point. If the Network B protocol normally includes an indication of the originating Call Control Point, the ILMC's request includes an indication that the ILMC itself should be treated as the originating Call Control Point for the purposes of call forwarding. This request includes a Network B Call Identifier identifying the call.

If necessary, the ILMC determines an appropriate Network A/Network B Gateway for the call, given the Network A Call Control Point, the Network B Call Control Point, and other information about the call. The process of determining which gateways are most appropriate, for the specific case of calls originating in circuit-switched networks and terminating in packet-switched networks, or vice-versa, is described in U.S. patent application Ser. No. 10/055,333, Apparatus And Method For Enabling Optimized Gateway Selection For Inter-Working Between Circuit-Switched And Internet Telephony.

In some cases, the ILMC requests a temporary routing number to the Network A/B Gateway instead of through the Network B Call Control Point. In this case, the destination information is also sent to the gateway.

5. The Network B Call Control Point returns a temporary routing address.

6. Used in other scenarios.

7. Used in other scenarios.

8. The ILMC locally stores information correlating the Network A and Network B Call Identifiers, and the identity of the Network A Call Control Point.

9. The ILMC returns the temporary routing number to the Network A Call Control Point.

10. The Network A Call Control Point extends its call to the Network A/Network B gateway.

11. The Network A/Network B gateway extends its call to the Network B Call Control Point.

12. The Network B Call Control Point performs steps to attempt to reach the destination terminal.

13. The Network B Call Control Point determines that the destination terminal cannot be reached. It has subscription information about the user that tells it that the user has requested call forwarding treatment for this condition.

14. The Network B Call Control Point sends a message to a network device that it believes to be the originating Call Control Point. However, because of the data in the initial location request, this request is actually sent to the ILMC. This message indicates that the call is to be forwarded, and indicates the condition that caused forwarding to be invoked. This message includes the Network B Call Identifier.

15. The ILMC consults its internal data store to determine the Network A Call Control Point and the Network A Call Identifier.

16. The ILMC sends a message to the Network A Call Control Point, indicating that the call is to be forwarded. This message includes the Network A Call Identifier.

17. The Network A Call Control Point queries the ILMC for the address to which the call is to be forwarded.

18. The ILMC requests a temporary routing address from Network C CCP.

18'. The ILMC receives a Network C temporary routing number, and determines and sets up a Network A/Network C gateway, in the same manner as was done for Network B earlier.

19. The ILMC returns the temporary routing number for the forwarding to the Network A Call Control Point.

20. The Network A Call Control Point terminates its extension of the call toward the Network A/Network C Gateway. The Gateway terminates the extension of the call to the Network B Call Control Point.

21. The Network A Call Control Point extends its call to the Network A/Network C gateway.

22. The Network A/Network C gateway extends its call to the Network C Call Control Point.

23. The Network C Call Control Point causes the forwarded address to be alerted.

24. For the purposes of illustration, assume that the terminal addressed by the forwarding address accepts the call. The call is completed, traversing the Network A Call Control Point, the Network A/Network C Gateway, and the Network C Call Control Point.

Figure 4A:
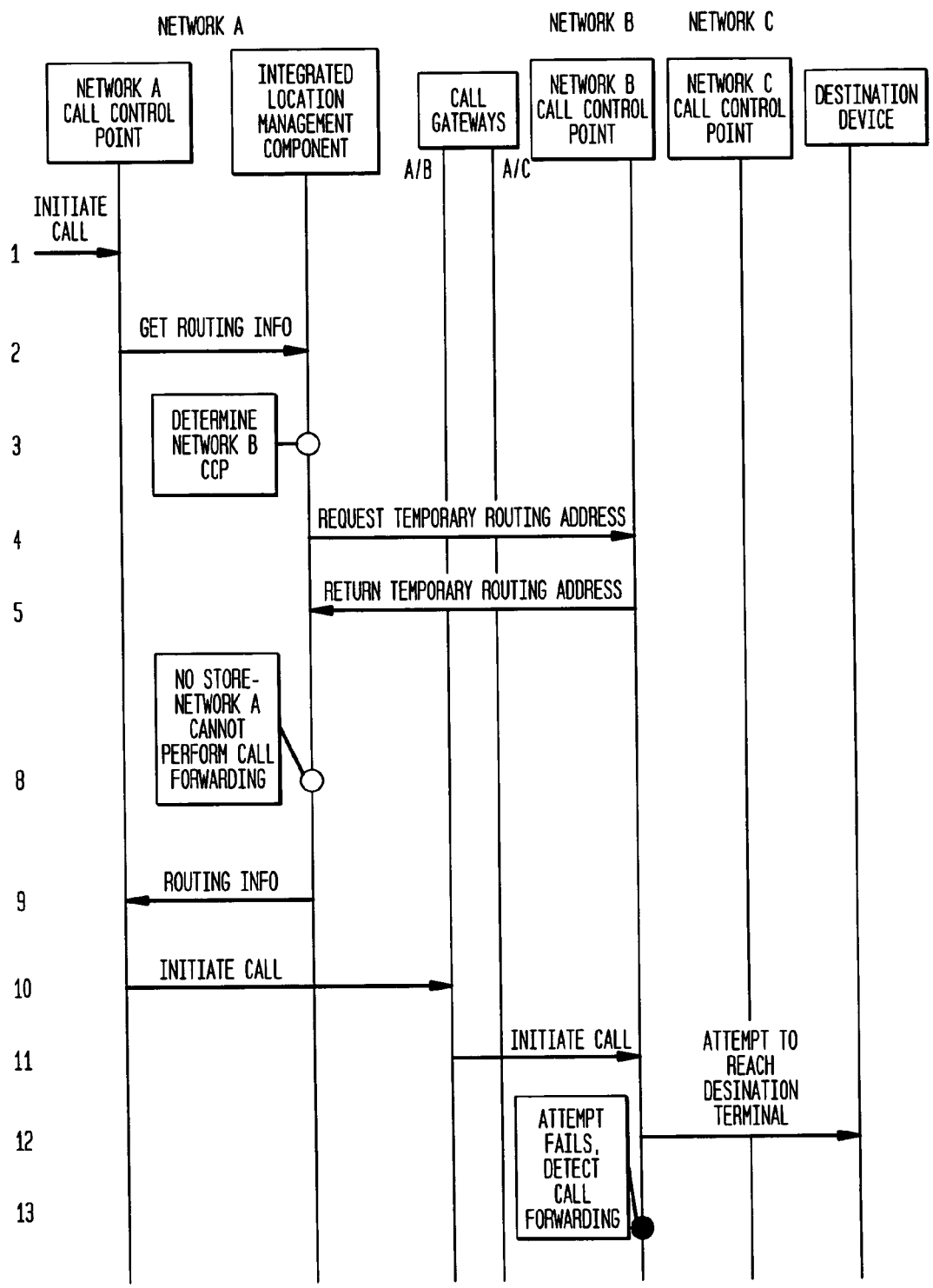
FIGS. 4A and 4B are simplified block diagrams showing the general call forwarding flow where Network B does the forwarding.
Figure 4B:
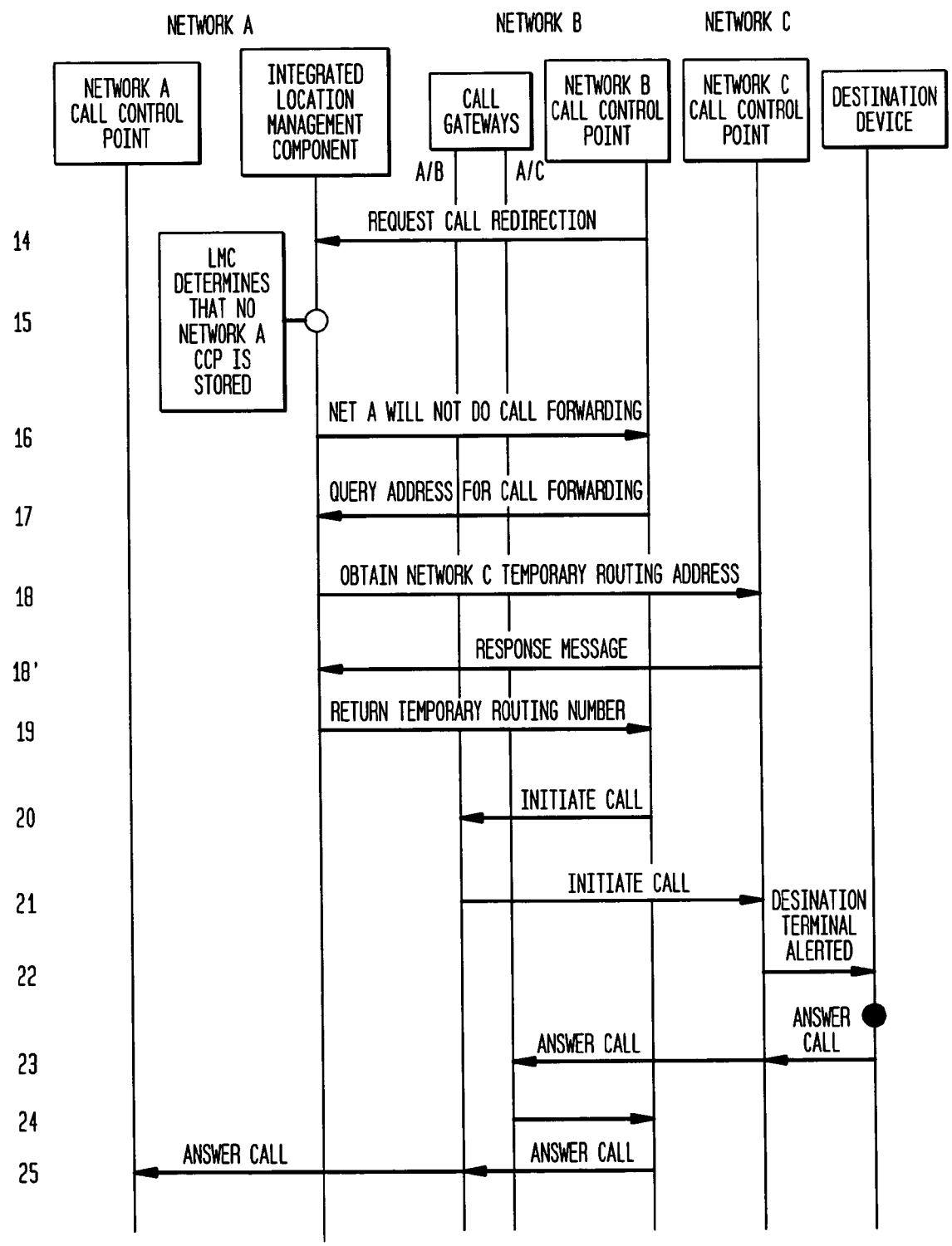

Call Forwarding by Network B: Alternately, in some scenarios, Network A cannot or will not perform call forwarding. In this case, call forwarding must be performed by Network B. The scenario of FIGS. 4A and 4B describe the steps that occur for inter-protocol call forwarding, when the forwarding process is performed in Network B.

1. A call is routed to a Network A Call Control Point, based on the subscriber's public address.

2. The Network A Call Control Point consults the ILMC to obtain a temporary routing number for the subscriber. This request includes an indication that the Network A Call Control Point cannot or will not perform call forwarding.

3. The ILMC determines the network or networks in which the user is currently located. For the purpose of this description, assume the user has only a single registered location. The Integrated Location Management Component determines the Network B Call Control Point that can reach the subscriber's terminal.

4. The ILMC requests a temporary routing address for the user from the Network B Call Control Point. If the Network B protocol normally includes an indication of the originating Call Control Point, the ILMC's request includes an indication that the ILMC itself should be treated as the originating Call Control Point for the purposes of call forwarding. This request includes a Network B Call Identifier identifying the call.

If necessary, the ILMC determines an appropriate Network A/Network B Gateway for the call, given the Network A Call Control Point, the Network B Call Control Point, and other information about the call. The process of determining which gateways are most appropriate, for the specific case of calls originating in circuit-switched networks and terminating in packet-switched networks, or vice-versa, is described in U.S. patent application Ser. No. 10/055,333, Apparatus And Method For Enabling Optimized Gateway Selection For Inter-Working Between Circuit-Switched And Internet Telephony. In some cases, the ILMC requests a temporary routing number to the Network A/B Gateway instead of through the Network B Call Control Point. In this case, the destination information is also sent to the gateway.

5. The Network B Call Control Point returns a temporary routing address.

6. Used in other scenarios.

7. Used in other scenarios.

8. The ILMC does not locally store any information about this call, as Network A cannot perform call forwarding.

9. The ILMC returns the temporary routing number to the Network A Call Control Point.

10. The Network A Call Control Point extends its call to the Network A/Network B gateway.

11. The Network A/Network B gateway extends its call to the Network B Call Control Point.

12. The Network B Call Control Point performs steps to attempt to reach the destination terminal.

13. The Network B Call Control Point determines that the destination terminal cannot be reached. It has subscription information about the user that tells it that the user has requested call forwarding treatment for this condition.

14. The Network B Call Control Point sends a message to a network device that it believes to be the originating Call Control Point. However, because of the data in the initial location request, this request is actually sent to the ILMC. This message indicates that the call is to be forwarded, and indicates the condition that caused forwarding to be invoked. This message includes the Network B Call Identifier.

15. The ILMC consults its internal data store to determine the Network A Call Control Point, but determines that none has been stored.

16. The ILMC responds to the Network B Call Control Point, indicating that the originating system will not perform call forwarding.

17. The Network B Call Control Point queries the Integrated ILMC for the address to which the call is to be forwarded.

18. The ILMC requests a temporary routing address from Network C

18'. The ILMC receives a Network C temporary routing number, and determines and sets up a Network B/Network C gateway, in the same manner as was done for Network A/Network B earlier.

19. The ILMC returns the temporary routing number for the forwarding to the Network B Call Control Point.

20. The Network B Call Control Point extends its call to the Network B/Network C gateway.

21. The Network B/Network C gateway extends its call to the Network C Call Control Point.

22. The Network C Call Control Point causes the forwarded address to be alerted.

23. For the purposes of illustration, we assume that the terminal addressed by the forwarding address accepts the call.

24. The Answer is acknowledged by the Network B/C Gateway.

25. The call is completed, traversing the Network A Call Control Point, the Network A/Network B Gateway, the Network B Call Control Point, the Network B/Network C Gateway, and the Network C Call Control Point.

It can now be seen that the invention includes a method for routing a call among a plurality of networks. A call is received in a subscriber's home network based on the subscriber's public address. A first call identifier is assigned for the call in the subscriber's home network. A second network determines where the subscriber may be located. A second call identifier is obtained for the call from the second network. A network interface is identified through which the call may be routed. And, the call is extended from the subscriber's home network through the first network interface into the second network using the first call identifier and the second call identifier. The first call identifier can be stored in association with the second call identifier. The identified gateway can also be stored in association with the first call identifier and the second call identifier.

Furthermore, the identified network interface can inform of the second call identifier and a network interface can obtain a call identifier from the identified network interface. And, the call can be extended from the subscriber's home network through the identified network interface into the second network using the first call identifier and the second call identifier.

Also, the subscriber's home network can be informed that the call is to be forwarded out of the second network to a third network. A third call identifier can be obtained for the call from the third network. And, a second network interface can be identified to which the call may be routed. The call can be extended from the subscriber's home network through the second network interface into the third network using the first call identifier and the third call identifier. And, the call between the subscriber's home network and the second network can be terminated.

It can be determined that the call is to be forwarded out of the second network to a third network. Then a third call identifier can be obtained for the call from the third network. A second network interface can be identified through which the call may be routed. Then the call can be extended through the second network interface into the third network using the second call identifier and the third call identifier. And, the call between the subscriber's home network and the second network through the first network interface is to be maintained in this case.

It can also be seen that an integrated location management apparatus can be used among a plurality of networks. The integrated location management can comprise a means for obtaining a first call identifier for a call responsive to a request from a subscriber's home network, a means for determining a second network where the subscriber may be located, a means for obtaining a second call identifier for the call from the second network, a means for identifying a network interface through which the call may be routed; and a means for communicating the identified network interface, the first call identifier and the second call identifier to the subscriber's home network.

The integrated location management apparatus can also include a database configured to store the first call identifier in association with the second call identifier. It can include a database configured to store the first call identifier in association with the second call identifier.

The integrated location management apparatus can be further configured to store the identified gateway in association with the first call identifier and the second call identifier. And, it can be configured to identify itself as an origin of the call to the second network in order to obtain the second call identifier.

The integrated location management apparatus can have a means for obtaining a third call identifier for the call from a third network responsive to an indication from the second network that the call is to be forwarded to a third network, a means for identifying a second network interface to which the call may be routed, and a means for communicating the second network interface, the first call identifier and the third call identifier to the subscriber's home network.

The integrated location management apparatus can further include a means for determining that the call is to be forwarded out of the second network to a third network, a means for obtaining a third call identifier for the call from the third network, and, a means for identifying a second network interface through which the call may be routed. There can be a means for communicating the first network interface, the first call identifier and the second call identifier to the subscriber's home network, and a means for communicating the second network interface, the second call identifier and the third call identifier to the second network.

Part II:

Exemplary Call Forwarding Flow Scenarios for Various Types of Networks

A Generalized System for Inter-Protocol Call Forwarding

Call Forwarding allows a call to be directed to a secondary number if an attempt to direct the call to the original dialed number fails, for example, because the called party was busy, did not answer, or was not reachable. UMTS, ANSI-41, and SIP, the three main protocols supported by the system, all define call-forwarding procedures. However, each of these protocols handles call forwarding somewhat differently. In order to consider things more systematically, we can consider call forwarding for three common cases in a generalized way. These three cases are: UMTS with support for optimal routing, ANSI-41, and SIP with a to-be-defined protocol connecting the System with the SIP proxy server. UMTS without Support of Optimal Routing (SOR) has to be handled specially. This case is discussed afterwards.

Figure 5:
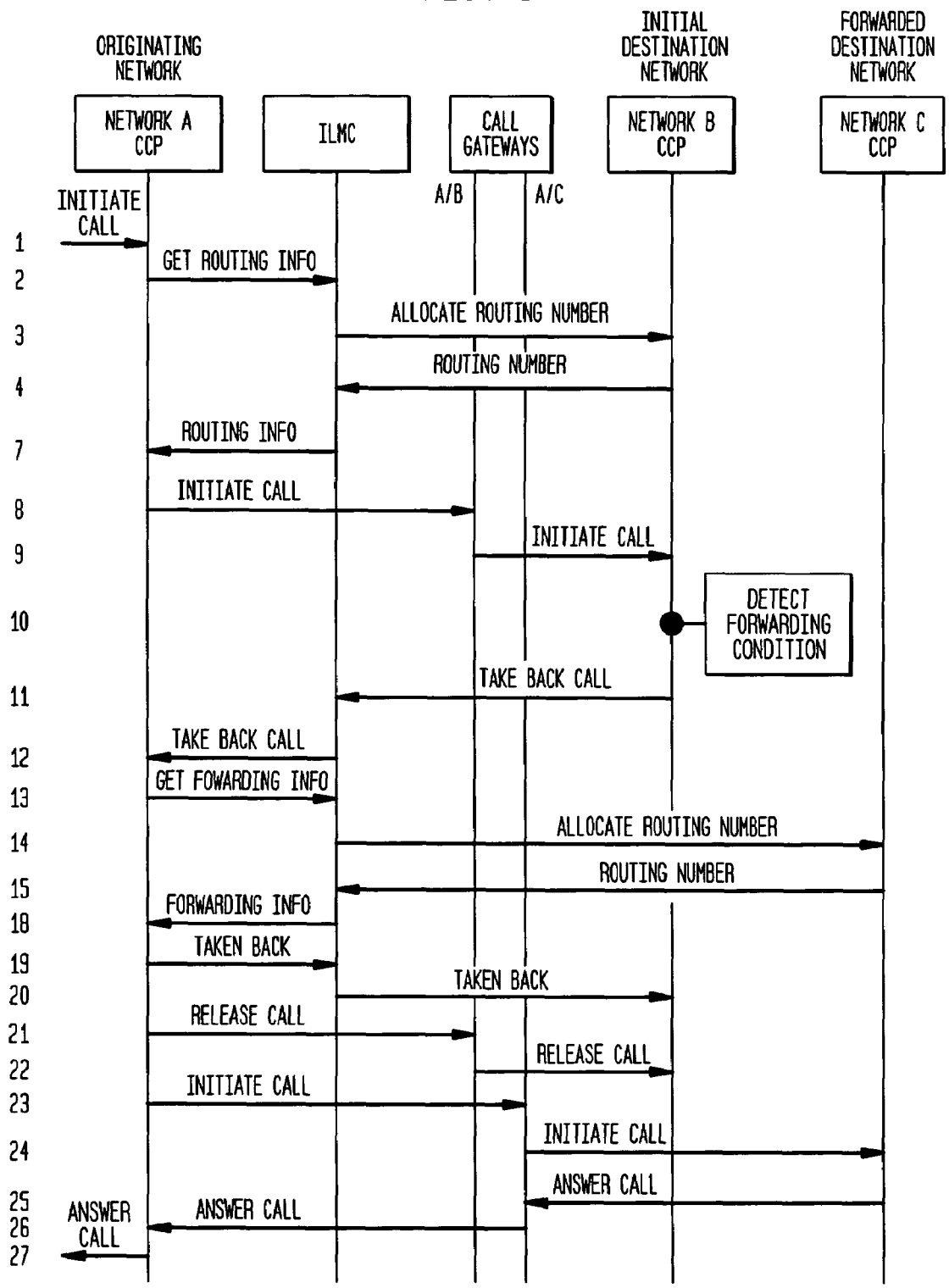
FIG. 5 is a simplified block diagram showing the general call forwarding flow.

FIG. 5 shows the general call flow for late call forwarding. Very few actual flows would involve all the steps shown here, but every step will occur in at least one flow. Specific descriptions of each step describe the meaning of each step in each protocol.

Initiate Call

1. The call flow begins when the call is initiated from the outside. Since the outside caller does not have any knowledge of the user's location, the call must be directed to a commonly known location, referred to here as the Network A CCP. This is a gMSC for UMTS, an oMSC for ANSI-41, or a home proxy server for SIP. The call initiation message is ISUP IAM for UMTS and ANSI-41, and INVITE for SIP.

Get Routing Info

2. When a call arrives at the network A CCP, the router must query the System to determine the location to which the call should be sent. UMTS and ANSI-41 define messages for this purpose, in their MAP suites: Send_Route_Info and LOCREQ respectively.

In SIP, the interface between proxy (Network A CCP) and registrar (ILMC) is undefined and left to implementation. The internal message called "Get Routing Info" can be used.

Allocate Routing Number

3. UMTS and ANSI-41 allocate a temporary routing number to allow an ISUP call initiation to be routed to the serving MSC. In this step, the System queries the destination device or network—the serving MSC—for this temporary routing number (the MSRN or TLDN). This message is Provide_Roaming_No for UMTS and ROUTEREQ for ANSI-41.

If the originating and destination networks both use SIP, this step is not necessary, as the System can return the destination SIP address to the originating SIP proxy. SIP addresses contain sufficient information to be fully routable to their destinations. Allocation of TSGN is part of Step 3, but the message can be sent to the Call Gateway. So, in steps 3 and 4, the message can go to the Call Gateway, instead of the destination/network (Network B CCP).

Routing Number

4. Once the destination system has allocated a routing number (a MSRN, TLDN, or TSGN), it returns it to the System. This message will be Provide_Roaming_No_Rsp for UMTS, routereq for ANSI-41, and a 200 OK to "ALLOCATE" for SIP. (Note that in each case this message is a standard transactional response to the request of step 3.) Steps 5-6 are not applicable to this scenario.

Routing Info

7. After all the routing information has been accumulated, the destination (the MSRN, TLDN, TSGN, or SIP URL) is sent back to the Network A CCP.

This message is Send_Route_Info_Rsp for UMTS, locreq for ANSI-41, and an internal message for SIP.

Initiate Call

8. Once the Network A CCP knows the correct destination for the call, it can actually begin to place the call toward this destination.

If the originating and destination networks use the same call-state signaling—i.e. if they are the same protocol, or if they share ISUP signaling—steps 8 and 9 are combined. In other cases, though—for us, if exactly one of the call legs uses SIP—the call must traverse the intermediate call gateway.

This message is IAM for UMTS and ANSI-41; INVITE for SIP.

Initiate Call

9. If step 8 was directed to the intermediate call gateway, then the gateway must subsequently forward the call initiation on to the destination network/system. This message is IAM for UMTS and ANSI-41; INVITE for SIP.

Detect Forwarding Condition

10. A forwarding condition (busy, no answer, not reachable, etc) is detected.

In UMTS and ANSI-41, the forwarding condition is detected by the serving MSC. The subscriber profile has to be configured with a list of conditions that should trigger forwarding, and thus the subsequent steps.

In SIP, the situation is somewhat more complicated. Busy and Not Reachable conditions are normally detected by the destination device (and reported as call setup failures). Normally, however, No Answer is detected by the intermediate node that performs the call treatment, by setting a timer that starts after the receipt of a 180 Ringing or 183 Session Progress message.

Possibilities for which device should do this for the SIP case include:

1) Adding an Expires: header to the request. Not all destination systems will necessarily honor this.

2) Communicating the expiration time to the call gateway (which does not work for the SIP-to-SIP case).

3) Communicating the expiration time to the original SIP proxy server. The SIP flows shown below perform this step in the call gateway for inter-worked calls to SIP, and in the home proxy server for SIP-to-SIP calls.

Call flows where forwarding conditions are detected in devices other than the destination network are shown in section 2.

Take Back Call

11. Once a forwarding condition is detected, the condition must be propagated back toward the originating network. If the originating and destination networks use the same protocol, this can be single message; otherwise, it can traverse the ILMC. As mentioned, FIG. 5 shows the flows when the forwarding condition is always detected in the destination network, as is always true for UMTS and mostly true for ANSI-41 and is sometimes true for SIP.

In UMTS, this is a Resume_Call_Handling message. In ANSI-41, this is REDREQ. For SIP, it will be an internal message to the initial call request.

Take Back Call

12. If we are doing inter-protocol forwarding, the Take_Back_Call message can be translated by the call gateway. Again, this message is Resume_Call_Handling for UMTS, REDREQ for ANSI-41, and an internal message for SIP.

Get Forwarding Info

13. Upon being told about a forwarding condition, the Network A CCP needs to determine the location to which the call is to be forwarded. To determine this, it queries the System again. For UMTS, this message is Send_Route_Info with the Interrogation type parameter set to forwarding, for ANSI-41, it is TRANUMREQ. For SIP, the address to query is an internal message; it should be a minor variation on the protocol that is decided for step 2 above. It is shown in the flows as an INVITE message sent to "user+feature@domain," but this is only for the purpose of illustration.

Allocate Routing Number

14. If the routing number is set to a locally handled address—i.e. it is not a directory number, or a SIP address being returned to a SIP system—the System must determine the routing information for the address. Steps 14-15 follow the same flow as steps 3-4 above.

Routing Number

15. As with step 4, above.

Forwarding Info

18. Once the System determines the address (permanent or temporary) to which the call should be forwarded, it returns it to the Network A CCP. This message will be Send_Route_Info_Ack for UMTS, tranumreq for ANSI-41, and an internal message for SIP.

Taken Back

19. For UMTS and ANSI-41, the "Take Back Call" message must be acknowledged. This message is Resume_Call_Handling_Ack for UMTS and redreq for ANSI-41. It does not carry any semantics other than the fact that the call was successfully taken back.

For SIP, the Take Call Back message is already a response to a message, so no subsequent message is needed here for SIP.

A SIP-to-UMTS or SIP-to-ANSI call gateway can generate a Resume_Call_Handling_Ack or redreq "spontaneously."

Taken Back

20. The Taken Back message must be translated by the call gateway if it is passing between different networks.

Release Call

21. Once the call has been taken back, UMTS and ANSI-41 networks must generate an ISUP REL message to clear the circuit path. This is not necessary for the pure SIP case.

SIP-to-UMTS/ANSI and UMTS-to-ANSI/SIP gateways will probably already have generated appropriate circuit-teardown messages at this point, but the exact flows still need to be worked out.

Release Call

22. Since the Release Call message notionally goes through the call gateway, it must be translated. However, since this step only occurs when SIP is involved.

Initiate Call

23. The originating system now initiates the call to the forwarded-to network. This may also have to traverse a gateway, if either the originating or the forwarded-to network is SIP.

Again, this message is ISUP IAM message for UMTS and ANSI-41, and also for the PSTN. It is INVITE for SIP.

Initiate Call

24. If the call initiation was gatewayed, the resulting call initiation (IAM or INVITE) is sent on to the forwarded destination network.

Answer Call

25. In this call flow, we assume that the call is answered by the forwarded destination. The call-answer message (ANM for ISUP-based protocols, 200 OK for SIP) is sent back towards the originator.

Answer Call

26. The call-answer message (ANM or 200 OK) is sent to the originating network.

Answer Call

27. The call-answer message (ANM or 200 OK) is sent to the call originator. At this point the call is established.

Variations on the Generic Call Flow:

In several cases, the generic call flow is varied somewhat.

Gateway Detects Forwarding Condition

Figure 6:
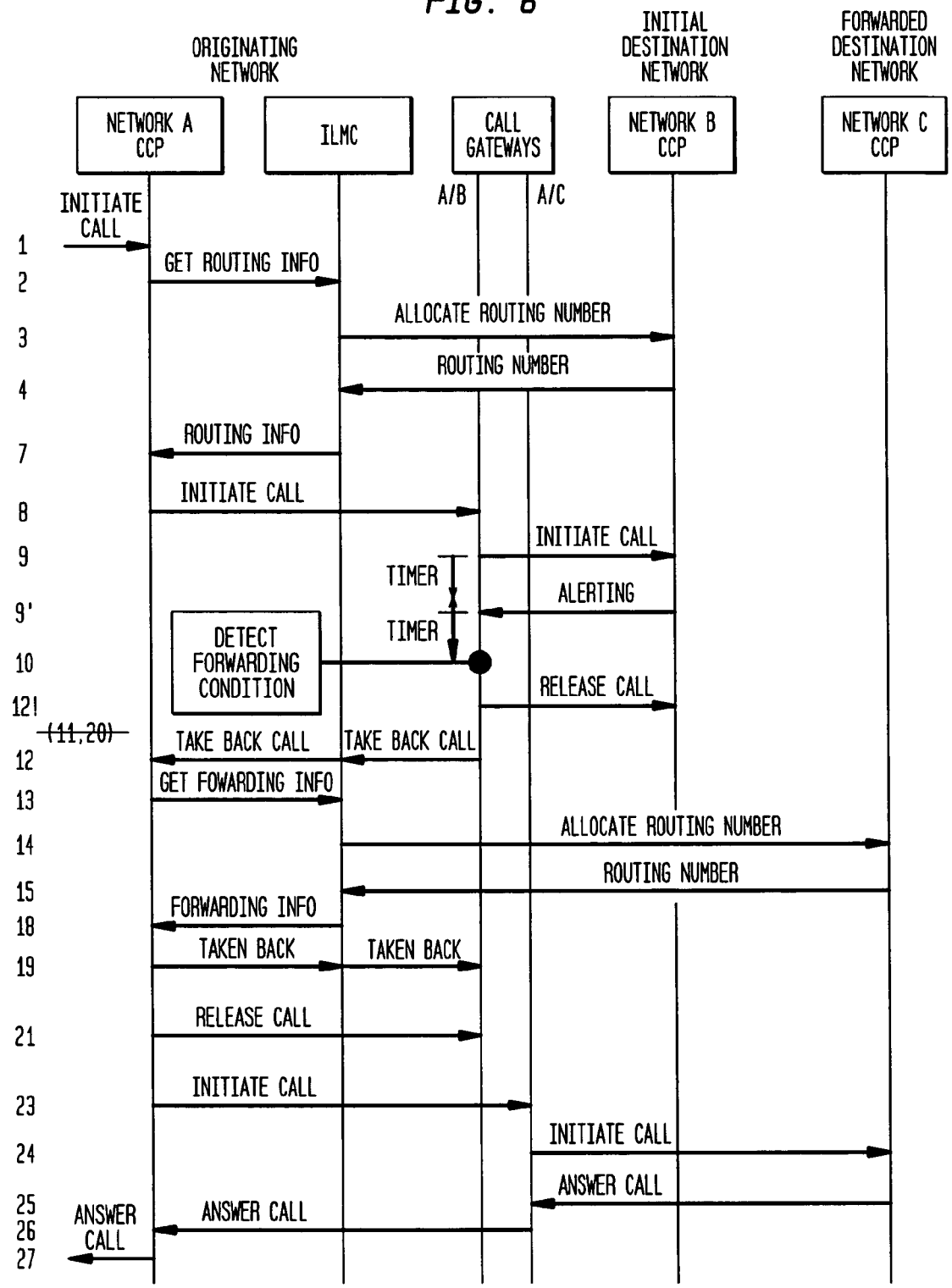
FIG. 6 is a simplified block diagram showing the case where a gateway detects a forwarding condition.

In some cases the gateway, rather than the destination system, must detect a call forwarding condition. This applies, for instance, for Call Forward No Answer for a call directed to SIP, as depicted in the scenario of FIG. 6.

There are a few differences between this call flow and the generic call flow. The primary difference is the way in which the gateway detects the forwarding condition. It does this by starting a timer when it initiates the call to the destination. This timer is reset, however, when an Alerting message arrives from the destination. This message is sent in the original full call flow, but is not shown, as it is merely protocol machinery in that case. This step is considered to be step 9'. Since this flow only occurs for SIP, this will always be a 180 Ringing message, or some variant of it (such as 183 Session Progress).

Additionally, because the gateway triggers the call forwarding condition, the flow of information between the gateway and the destination is reversed. This consists only of a call tear down, which is considered to be an out-of-place step 22. Since it is out of place, it is indicated as "22!" Steps 11 and 20 do not occur in this flow.

Network A CCP Detects Forwarding condition

Figure 7:
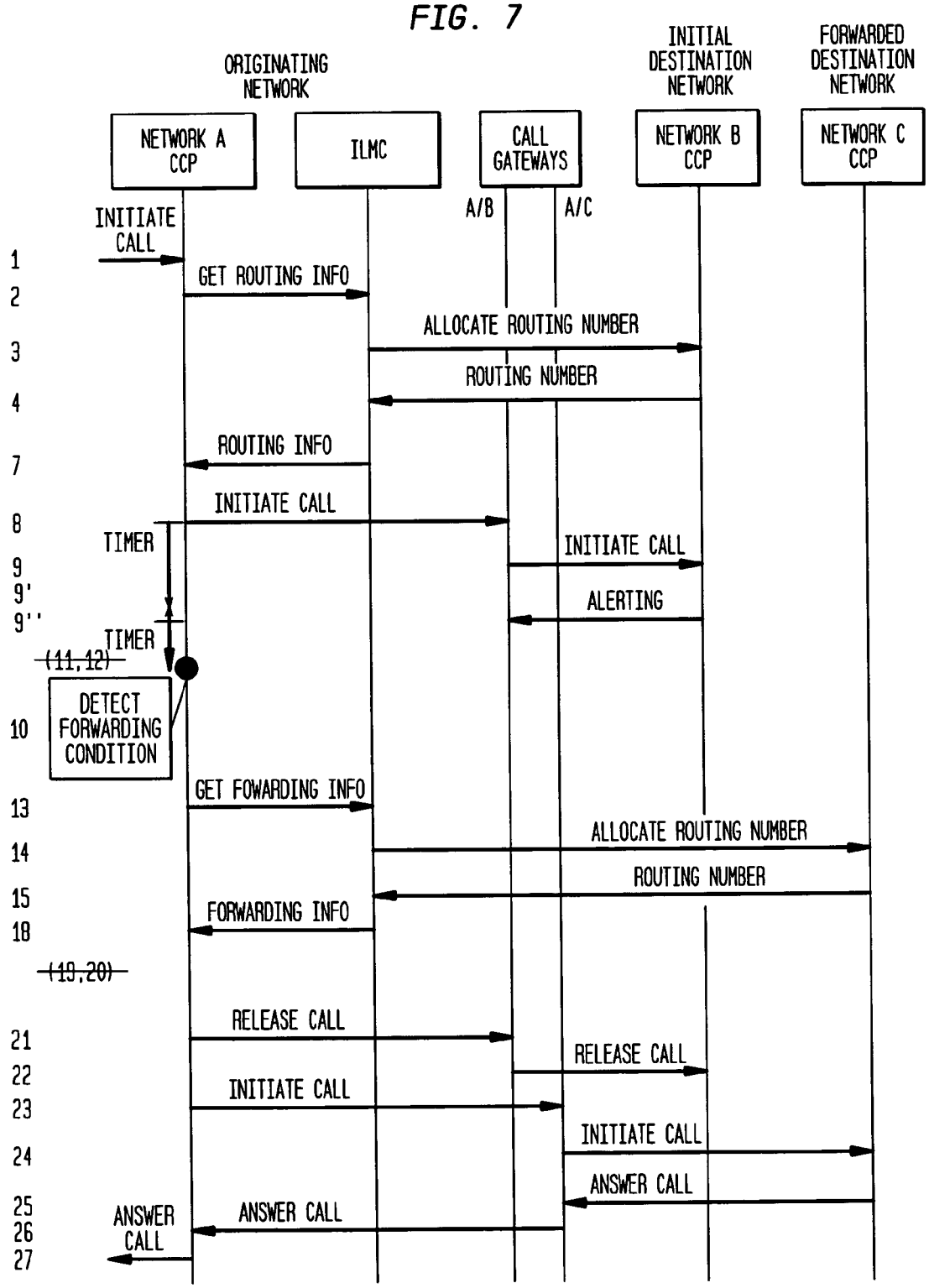
FIG. 7 is a simplified block diagram showing the case where the Network A CCP detects the forwarding condition.

This example, shown in FIG. 7, is generally applicable in a SIP-to-SIP forwarding case. This scenario can also be used for ANSI41 originating network, but using the ANSI41 multiple access hunting (MAH) feature.

As in the previous section, the System instructs a device—in this case, the Network A CCP—to set a timer in order to detect a forwarding condition. Again, this timer is affected by receipt of the Alerting message. Since this message needs to get all the way back to the Network A CCP, two messages are used to represent it, 9' and 9". Because forwarding information need not be communicated back to the Network A CCP, steps 11, 12, 19, and 20 are omitted in this case.

Unlike the previous call flow of FIG. 6, this flow postpones call termination to the initial system until a number is assigned to reach the forwarded system. This allows better rainy day and race-condition behaviors.

Originating Network Won't do Call Forwarding

Figure 8:
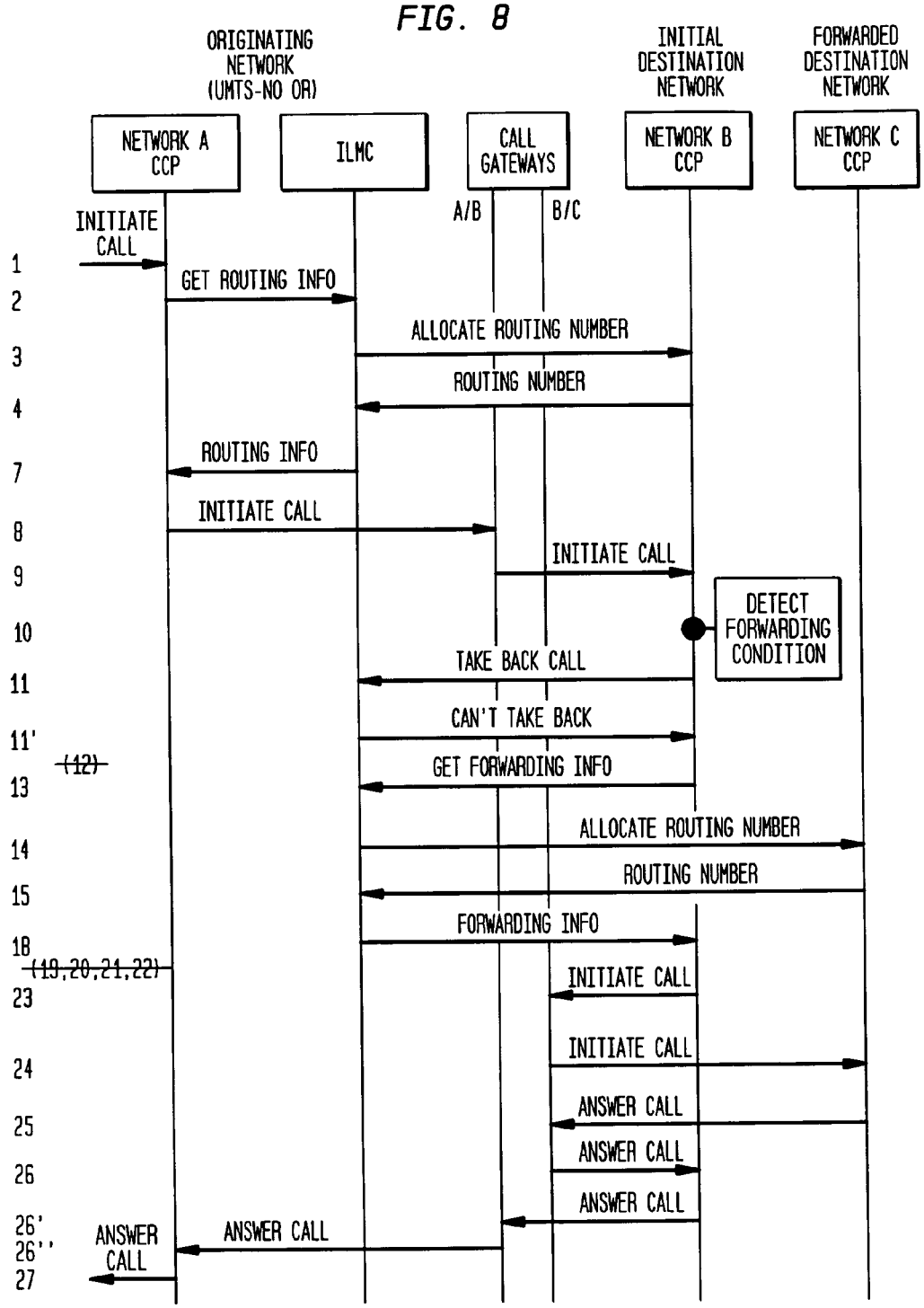
FIG. 8 is a simplified block diagram showing the case where the originating network does not do the call forwarding.

In some cases, such as the scenario of FIG. 8, the originating network either cannot do call forwarding, or refuses to do so. This is often the case for UMTS, either if Optimal Routing is not supported, or the systems have decided that it is not appropriate for the call. Note that in this case the ILMC must reject the attempt to return the call to the originating system, telling the destination system to perform the call-forwarding operation itself. (In some cases—as in using a gateway to connect from UMTS without optimal routing (OR) to SIP—the gateway must take over some of these functions itself.) Because there's no communication of the call forwarding information from the destination to the origin systems, steps 12, 19, 20, 21, and 22 are skipped. The Answer Call message, and thus the circuit call path, must traverse additional servers in this model. The additional hops are represented as steps 26' and 26" in FIG. 8.

Specific Flows—Origin and Initial Destination the Same.

In this section, specific call flows are illustrated for the cases when the origin and the initial destination networks are the same. The forwarded destination network is left abstract, as "Obtain CF#" and "Destination Answers" ovals.

ANSI to ANSI

Figure 9:
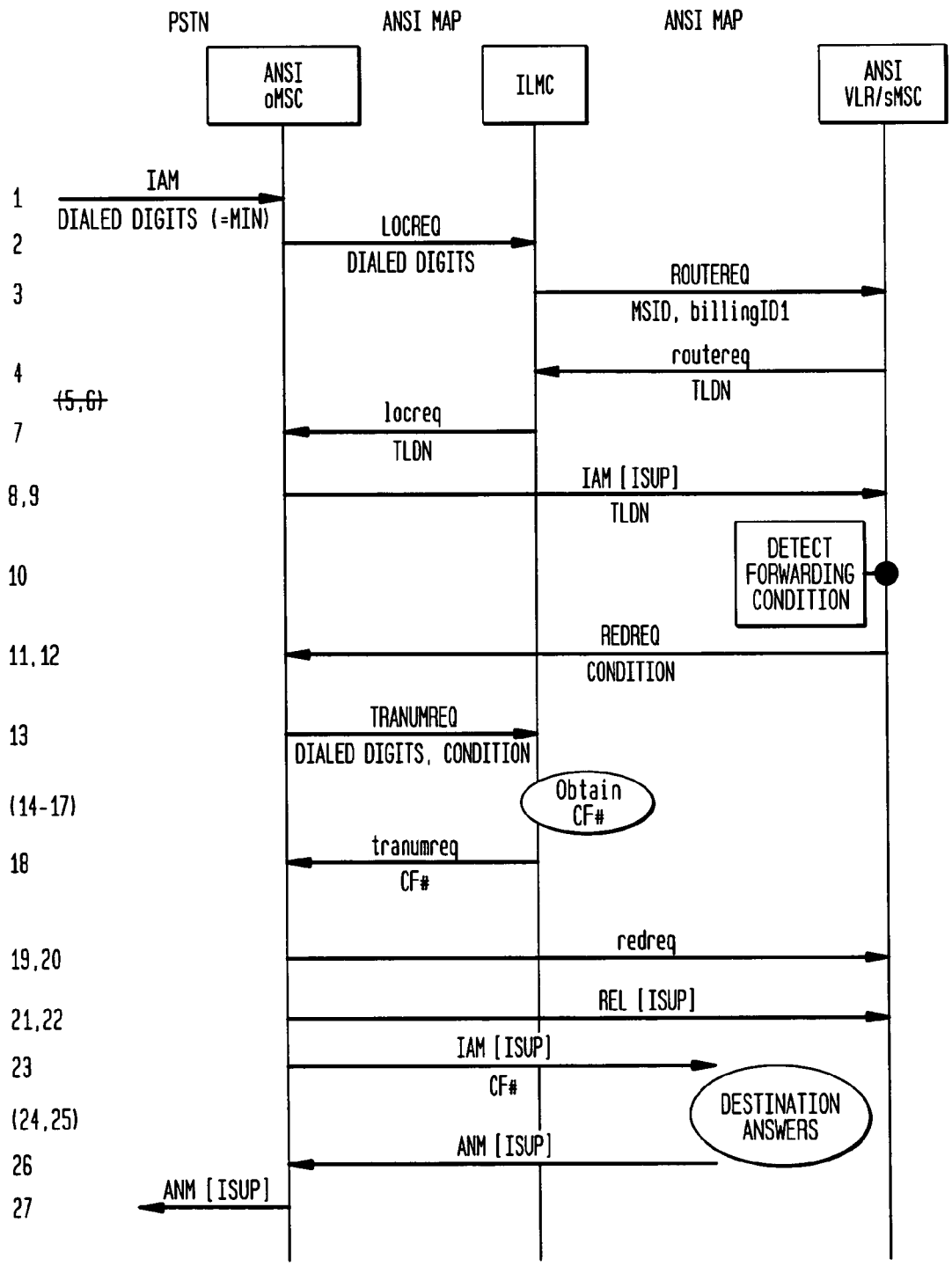
FIG. 9 is a simplified block diagram showing the case where the origin and the destination are the same type ANSI network.

FIG. 9 illustrates an ANSI to ANSI call flow, based on the flow of FIG. 5.

UMTS to UMTS

UMTS-OR to UMTS-OR

Figure 10:
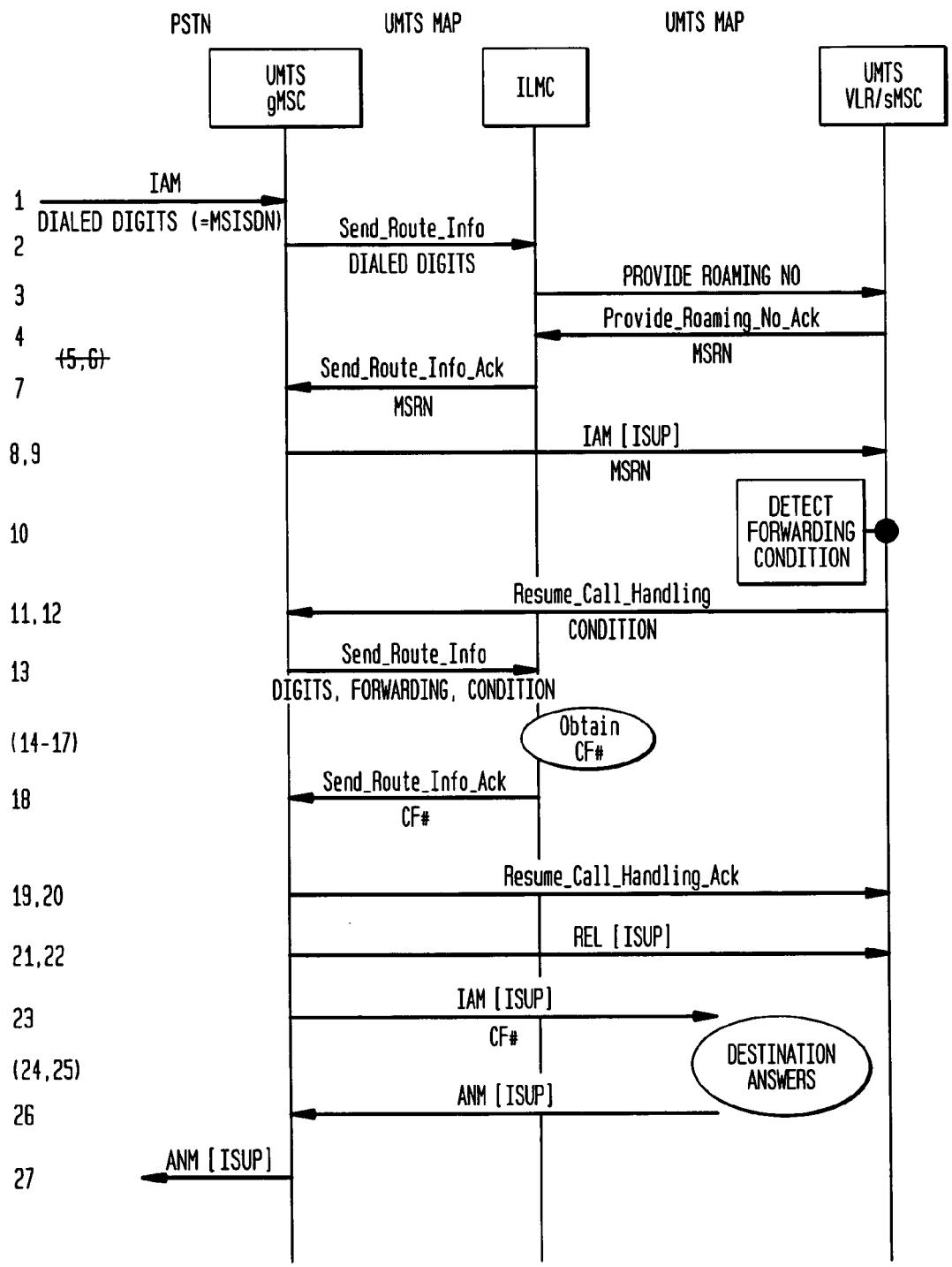
FIG. 10 is a simplified block diagram showing the case where the origin and the destination are the same type UMTS-OR (optimal routing) network.

FIG. 10 illustrates a UMTS-OR to UMTS-OR call flow, based on the call flow of FIG. 5.

SIP to SIP

Figure 11:
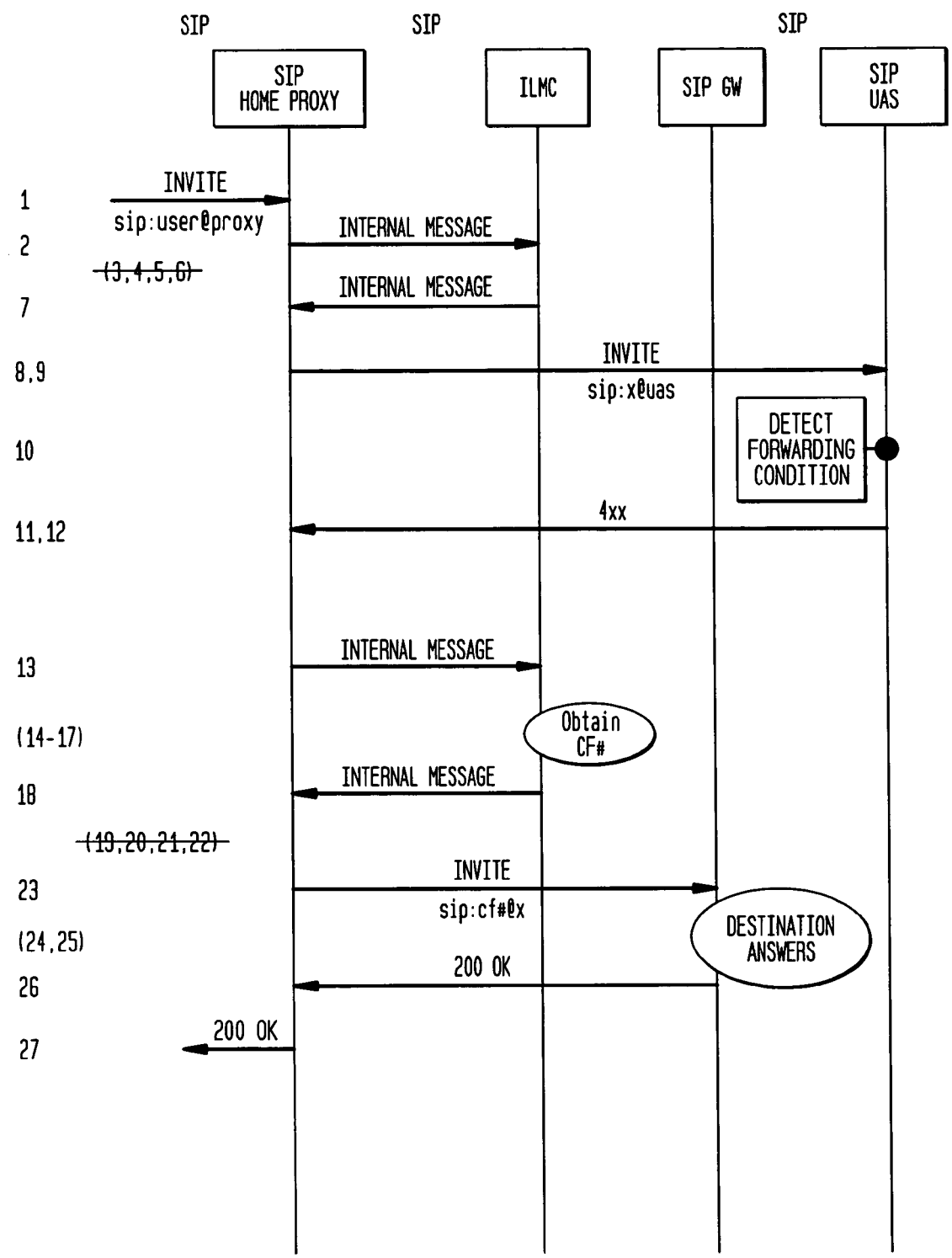
FIG. 11 is a simplified block diagram showing the case where the call forwarding condition is detected at the destination in an SIP to SIP network connection.

Call Forwarding Condition Detected at Destination.
FIG. 11 illustrates the case wherein the call forwarding condition is detected at the destination. This case applies for the busy, not reachable, and call refused conditions. This call flow is based on the call flow of FIG. 5.

Figure 12:
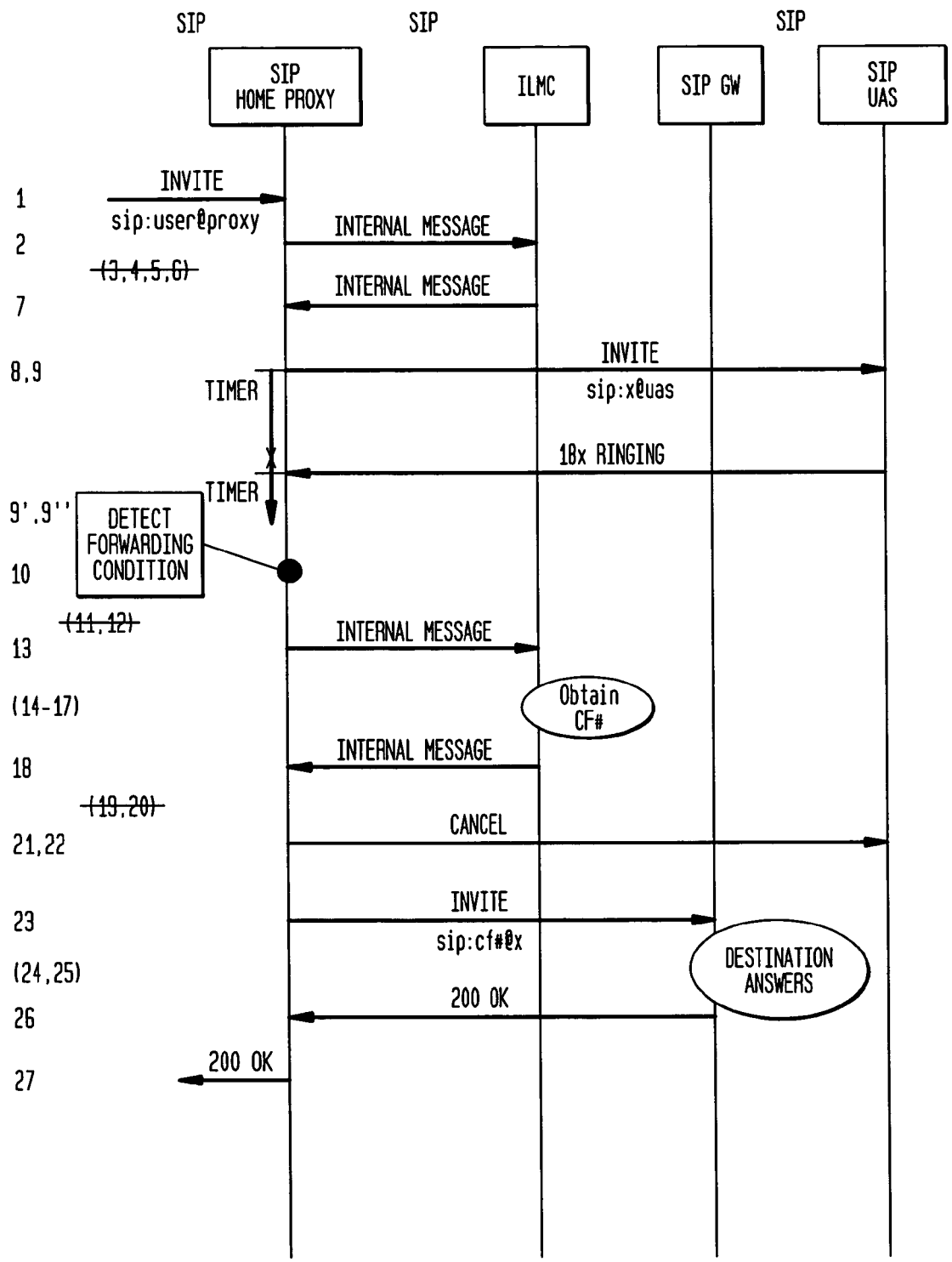
FIG. 12 is a simplified block diagram showing the case where the call forwarding condition is detected at the home proxy in an SIP to SIP network connection.

Call Forwarding Condition Detected at Home Proxy.
FIG. 12 depicts the call flow for the no answer condition. This call flow is based on the call flow of FIG. 7.

Call Forwarding Inter-Working Flows
In this section, specific call flows are shown wherein the origin and the initial destination networks are different. Again, the forwarded destination networks are left abstract, as "Obtain CF#" and "Destination Answers" ovals.

Inter-Working Flows from ANSI:

Call from ANSI to UMTS

Figure 13:
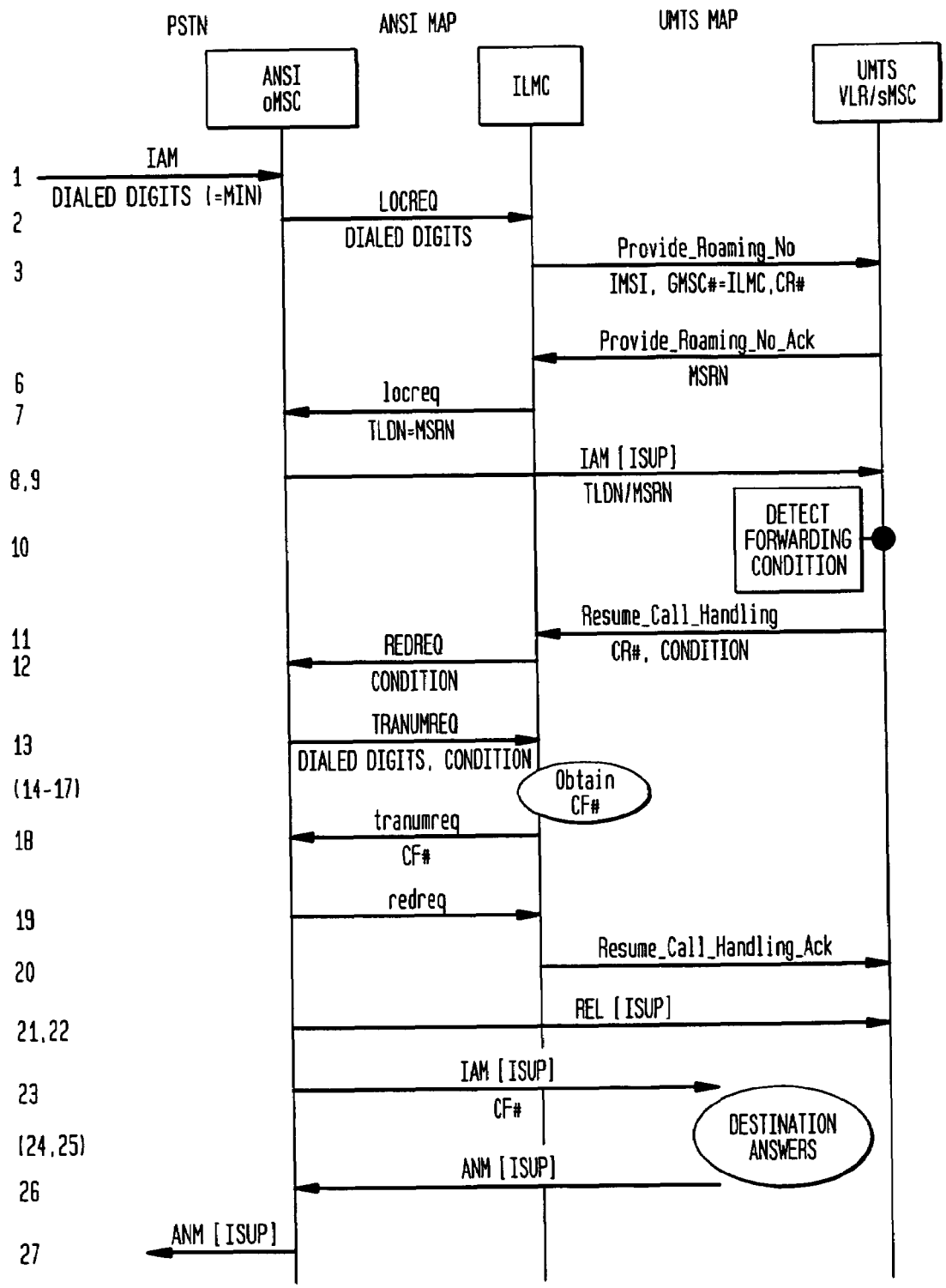
FIG. 13 is a simplified block diagram showing the inter-working flow (inter-operation) between an ANSI and a UTMS-OR network.

Call from ANSI to UMTS-OR
FIG. 13 depicts a call flow for the call from ANSI to UNTS-OR scenario. This call flow is based on the call flow of FIG. 5.

Call from ANSI to UMTS-without-OR
This is based on the flow of FIG. 6. (Network A CCP detects a forwarding condition) See FIG. 13.

Call from ANSI to SIP

Figure 14:
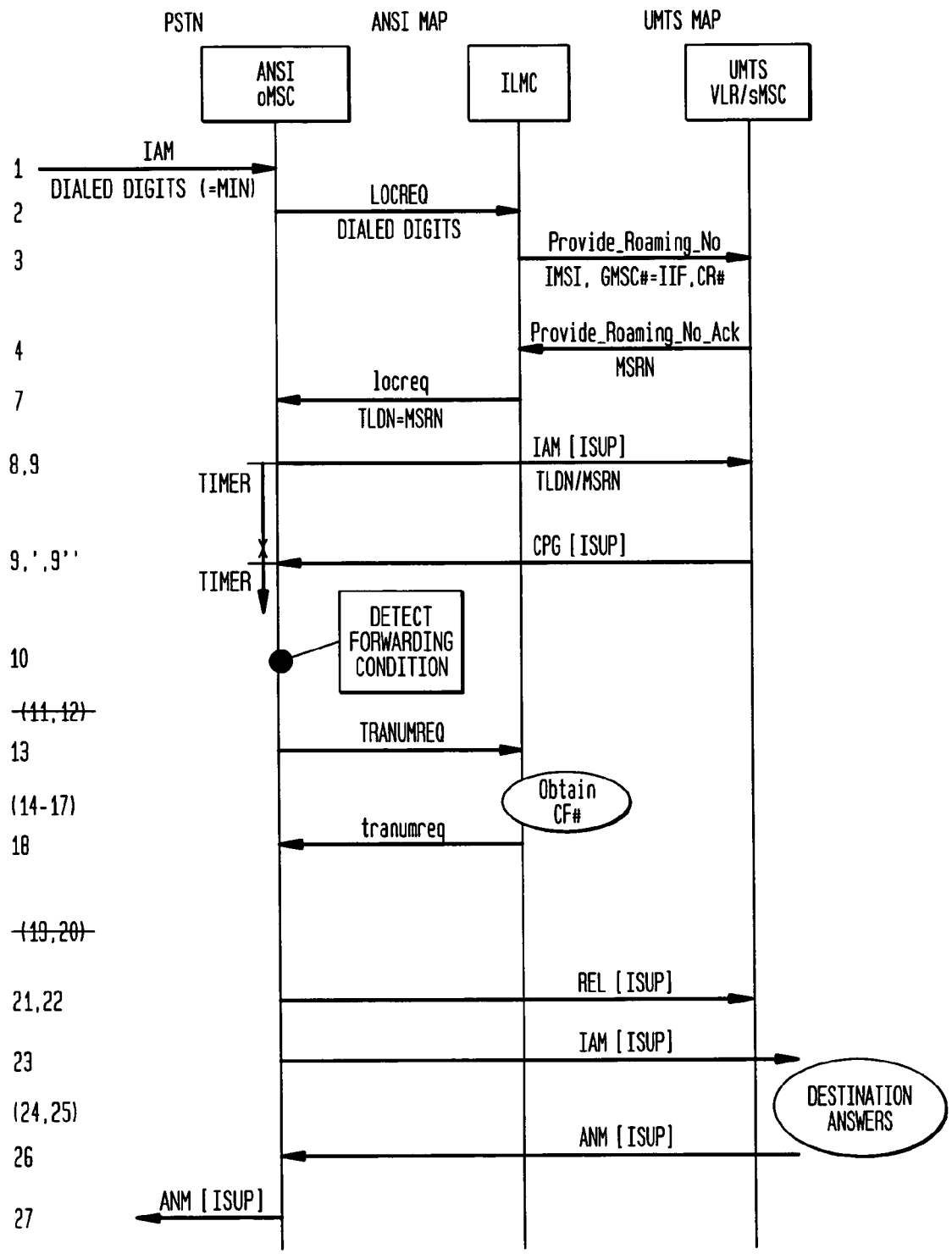
FIG. 14 is a simplified block diagram showing the inter-working flow (inter-operation) between an ANSI and a UTMS-without-OR network.

Call from ANSI to SIP—Condition Detected at Destination
This case applies for the busy, not reachable, and call refused conditions. See FIG. 14.
This is based on the flow of FIG. 4.

Figure 15:
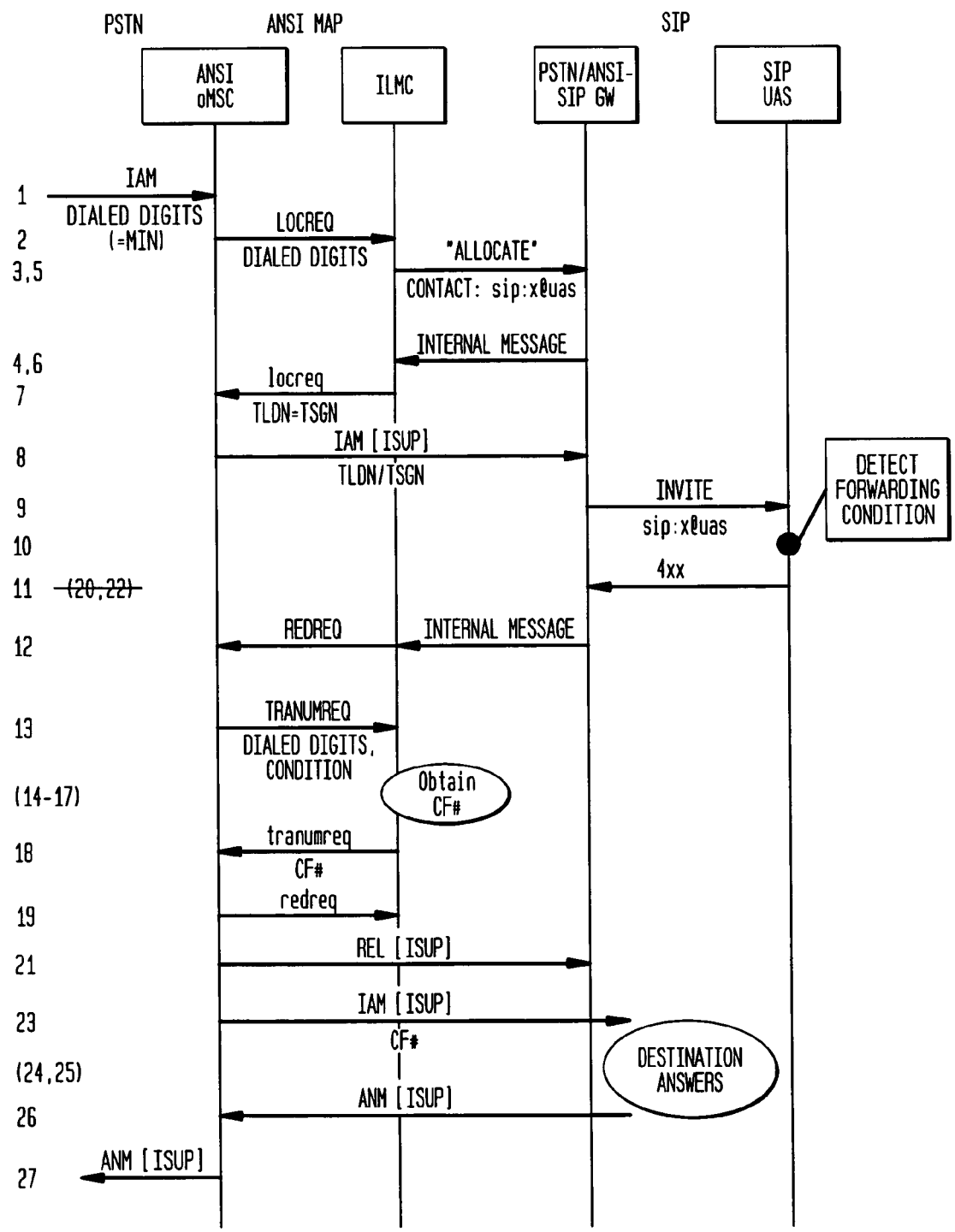
FIG. 15 is a simplified block diagram showing the inter-working flow (inter-operation) between an ANSI and an SIP network, where the call forwarding condition is detected at the destination.

Call from ANSI to SIP—Condition Detected at Gateway
This case applies for the no answer condition. See FIG. 15. This is based on the flow of FIG. 6.

Call from UMTS

Call from UMTS-OR

Figure 16:
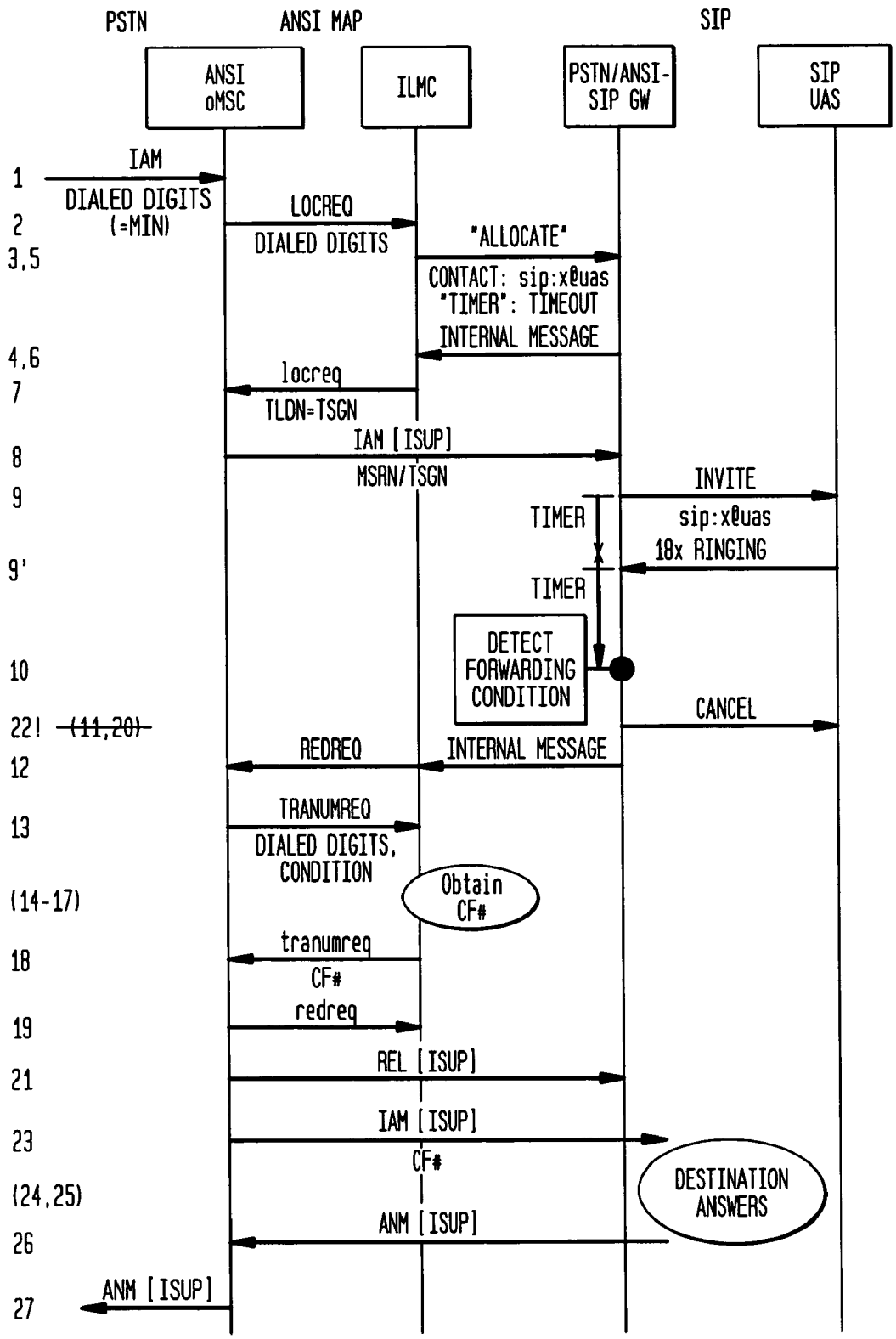
FIG. 16 is a simplified block diagram showing the inter-working flow between an ANSI and an SIP network, where the call forwarding condition is detected at the gateway.

Call from UMTS-OR to ANSI
See FIG. 16. This is based on the flow of FIG. 4.

Figure 17:
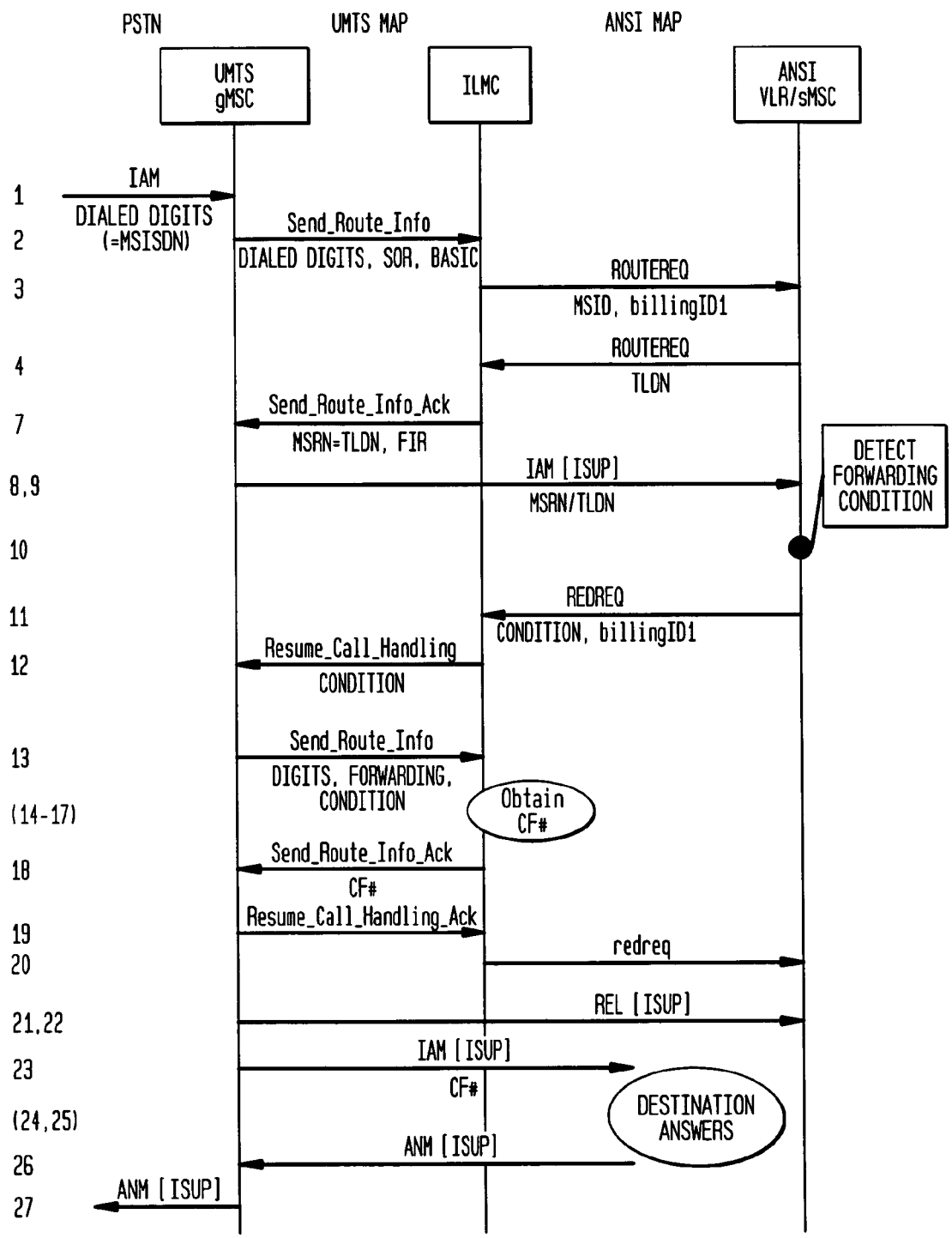
FIG. 17 is a simplified block diagram showing the case where the call is from a UTMS-OR network to an ANSI network.
Figure 18:
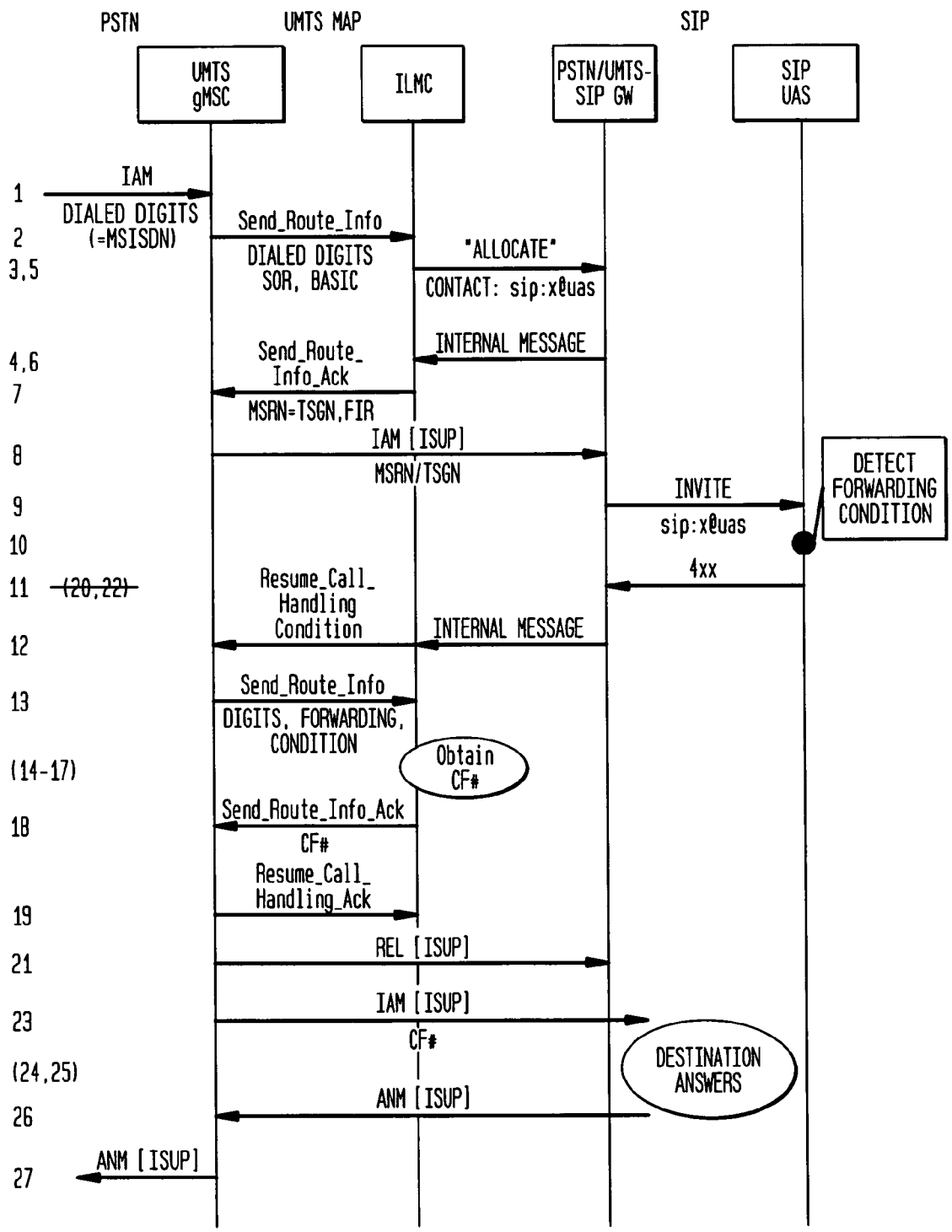
FIG. 18 is a simplified block diagram showing the case where the call is from a UTMS-OR network to a SIP network, where the call forwarding condition is detected at the destination.

Call from UMTS-OR to SIP
Call from UMTS-OR to SIP—Forwarding Condition Detected at Destination
This case applies for the busy, not reachable, and call refused conditions. See FIG. 17. This is based on the flow of FIG. 4.
Call from UMTS-OR to SIP—forwarding condition detected at gateway
This case applies for the no answer condition. See FIG. 18. This is based on the flow of FIG. 6.

Call from UMTS-without-OR

Figure 19:
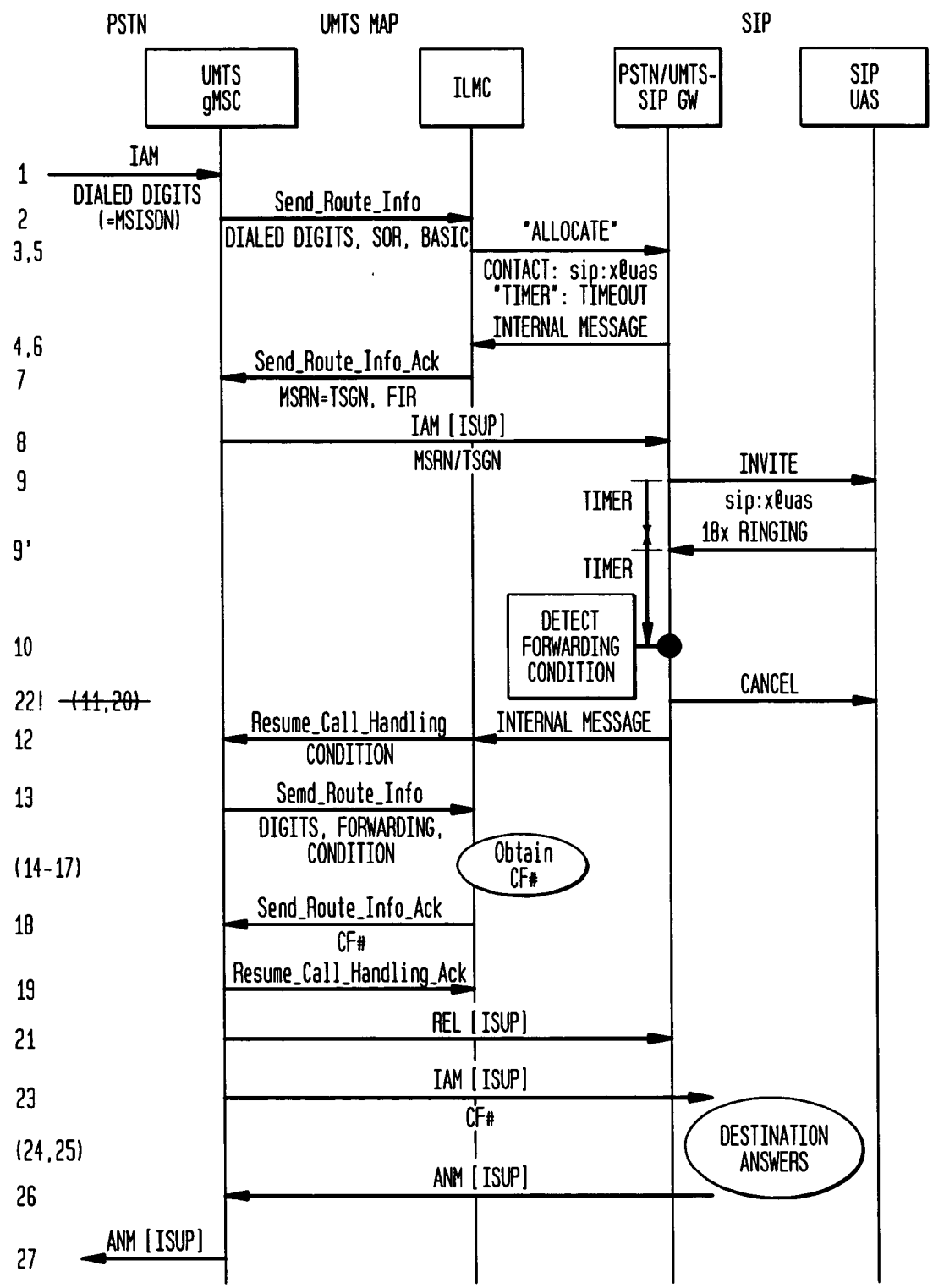
FIG. 19 is a simplified block diagram showing the case where the call is from a UTMS-OR network to a SIP network, where the call forwarding condition is detected at the gateway.

Call from UMTS-without-OR to ANSI
See FIG. 19. This is based on the flow of FIG. 7.

Figure 20:
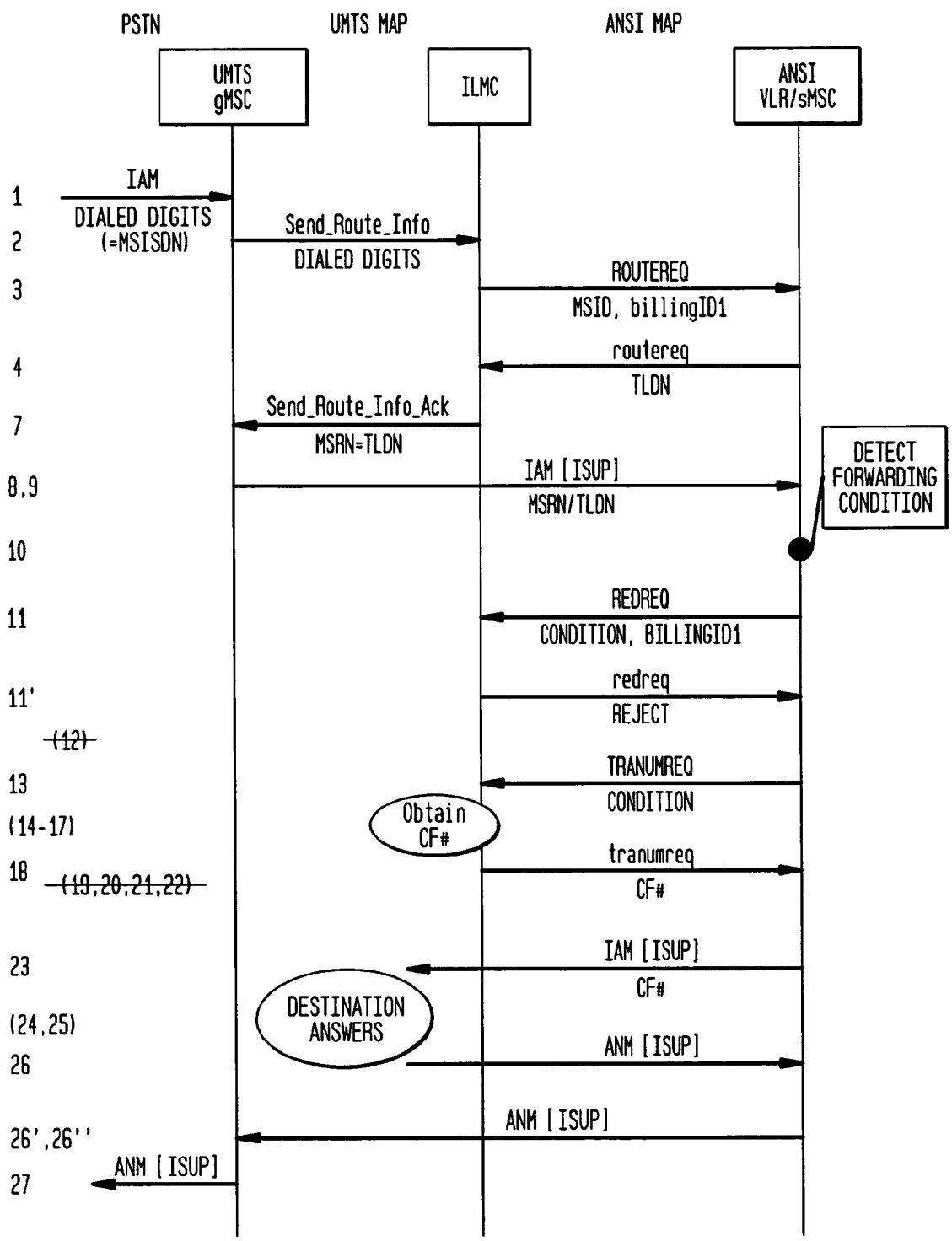
FIG. 20 is a simplified block diagram showing the case where the call is from a UMTS-without-OR network to an ANSI network.
Figure 21:
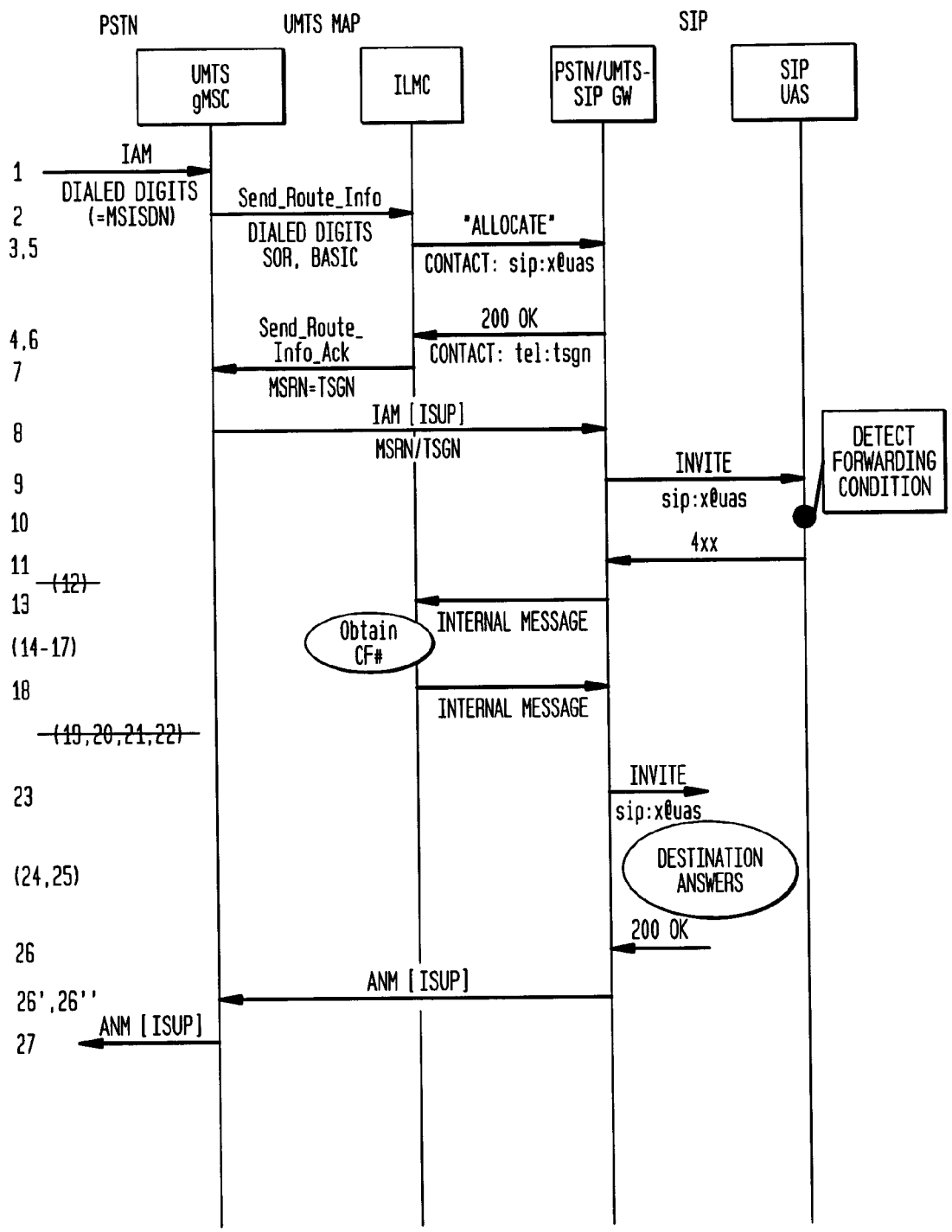
FIG. 21 is a simplified block diagram showing the case where the call is from a UMTS-without-OR network to a SIP network, where the call forwarding condition is detected at the destination.

Call from UMTS-without-OR to Sip
Call from UMTS-without-OR to SIP—forwarding condition detected at destination This case applies for the busy, not reachable, and call refused conditions. This is based on a minor modification of flow 7. See FIG. 20.
Call from UMTS-without-OR to SIP—forwarding condition detected at gateway
This case applies for the no answer condition. This is based on a combination of flow 3 and flow 7. See FIG. 21.

Call from SIP

Figure 22:
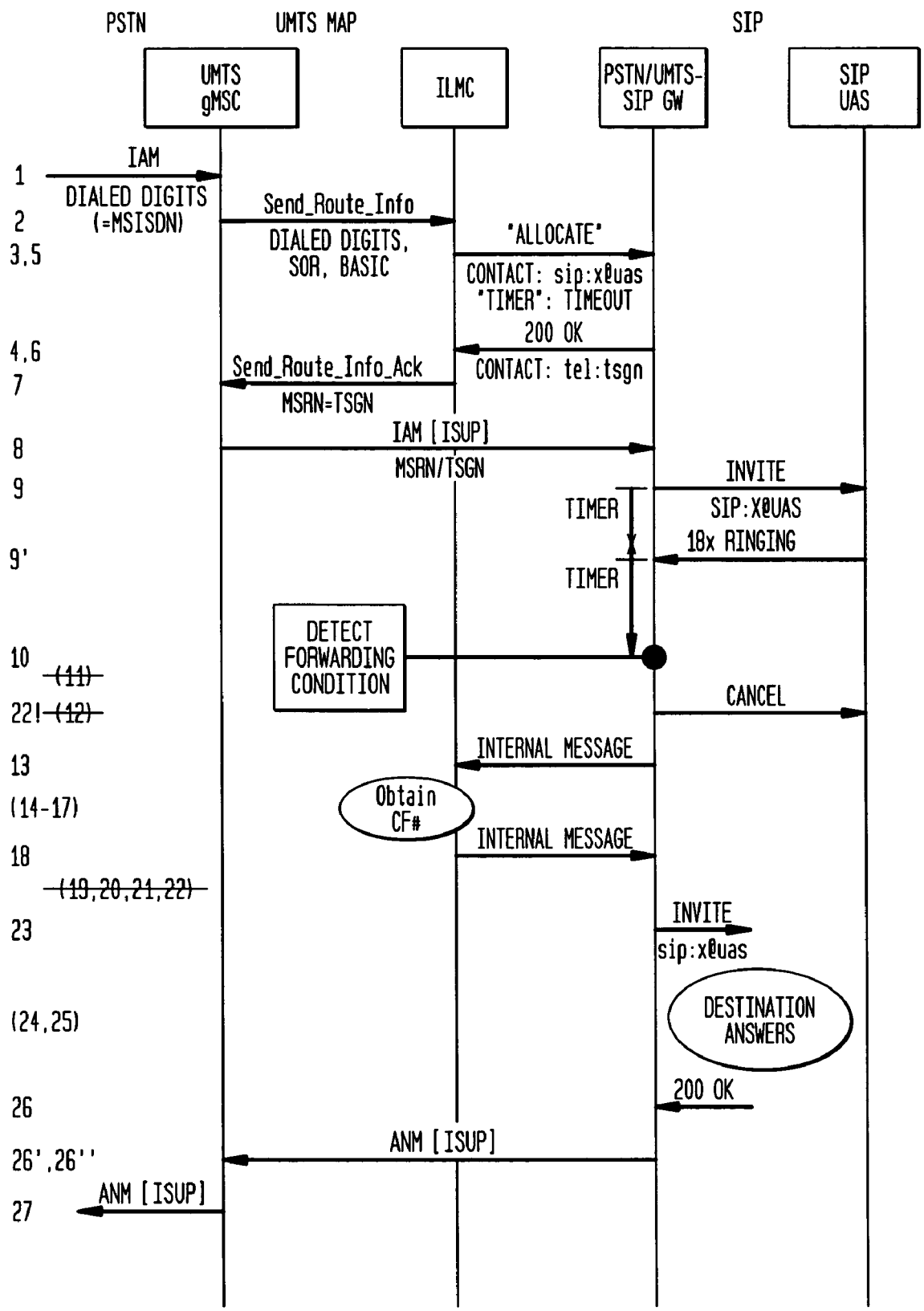
FIG. 22 is a simplified block diagram showing the case where the call is from a UMTS-without-OR network to a SIP network, where the call forwarding condition is detected at the gateway.

Call from SIP to ANSI
This is based on the flow of FIG. 4. See FIG. 22.

Call from SIP to UMTS

Figure 23:
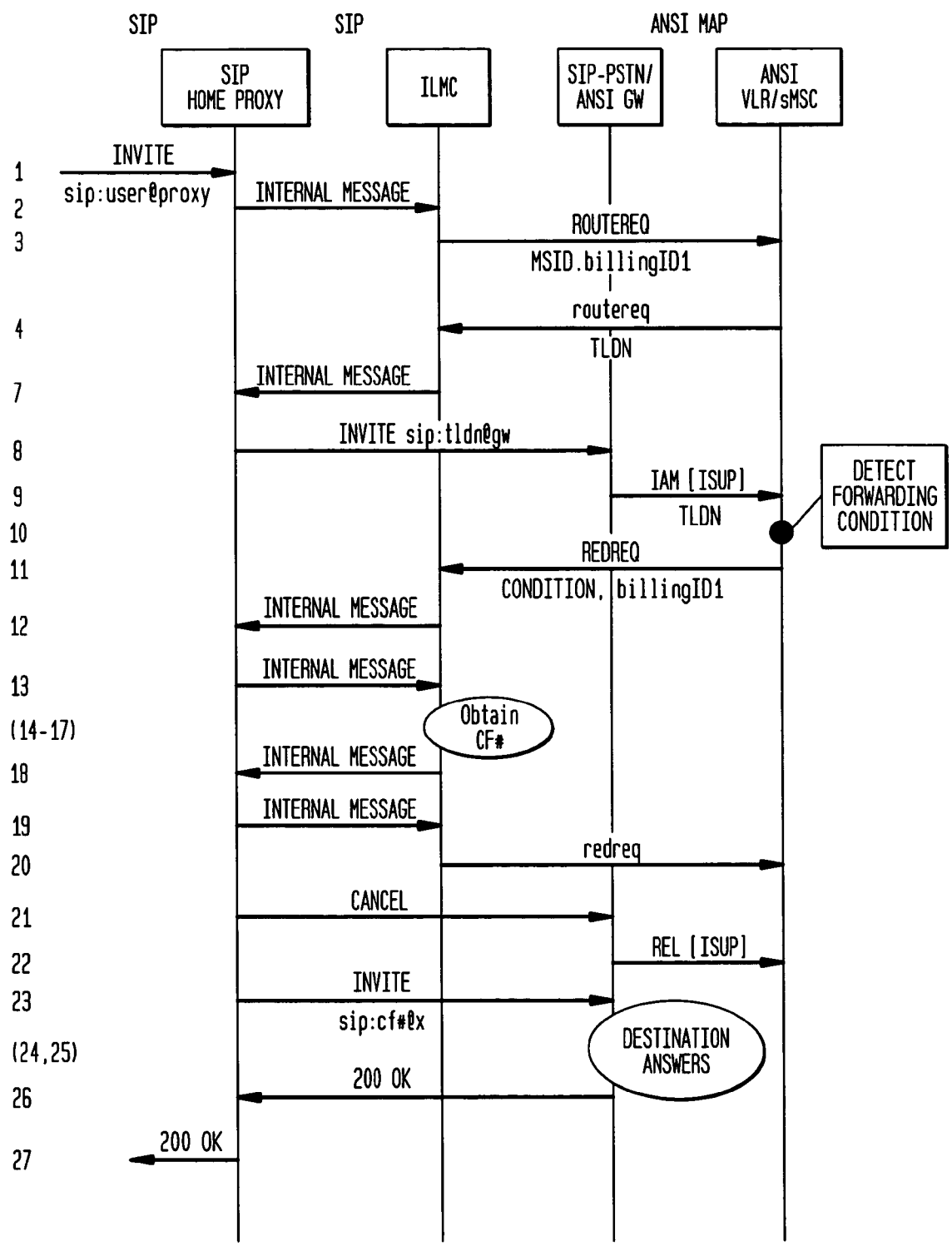
FIG. 23 is a simplified block diagram showing the case where the call is from a SIP network to an ANSI network.
Figure 24:
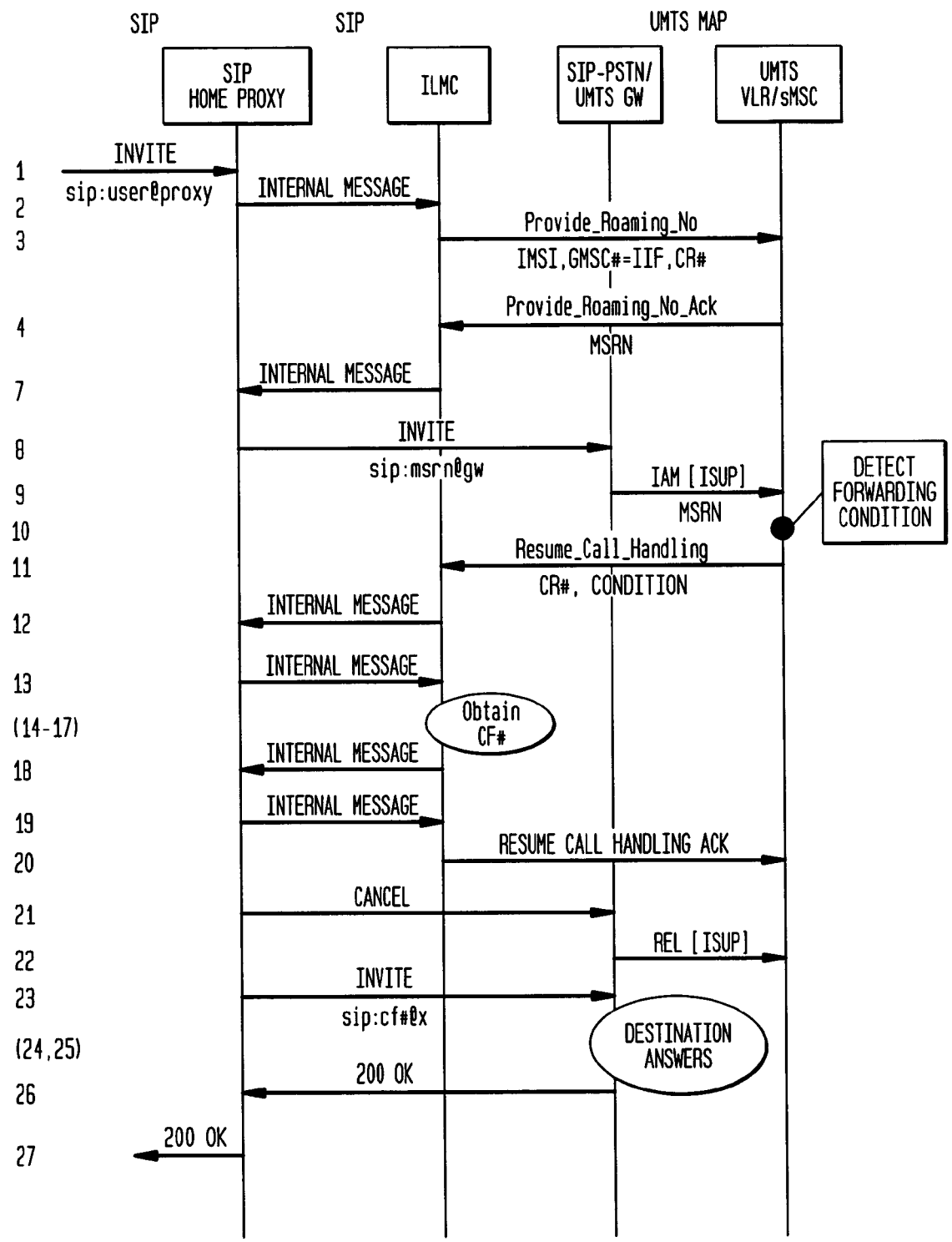
FIG. 24 is a simplified block diagram showing the case where the call is from a SIP network to an UMTS-OR network.
Figure 25:
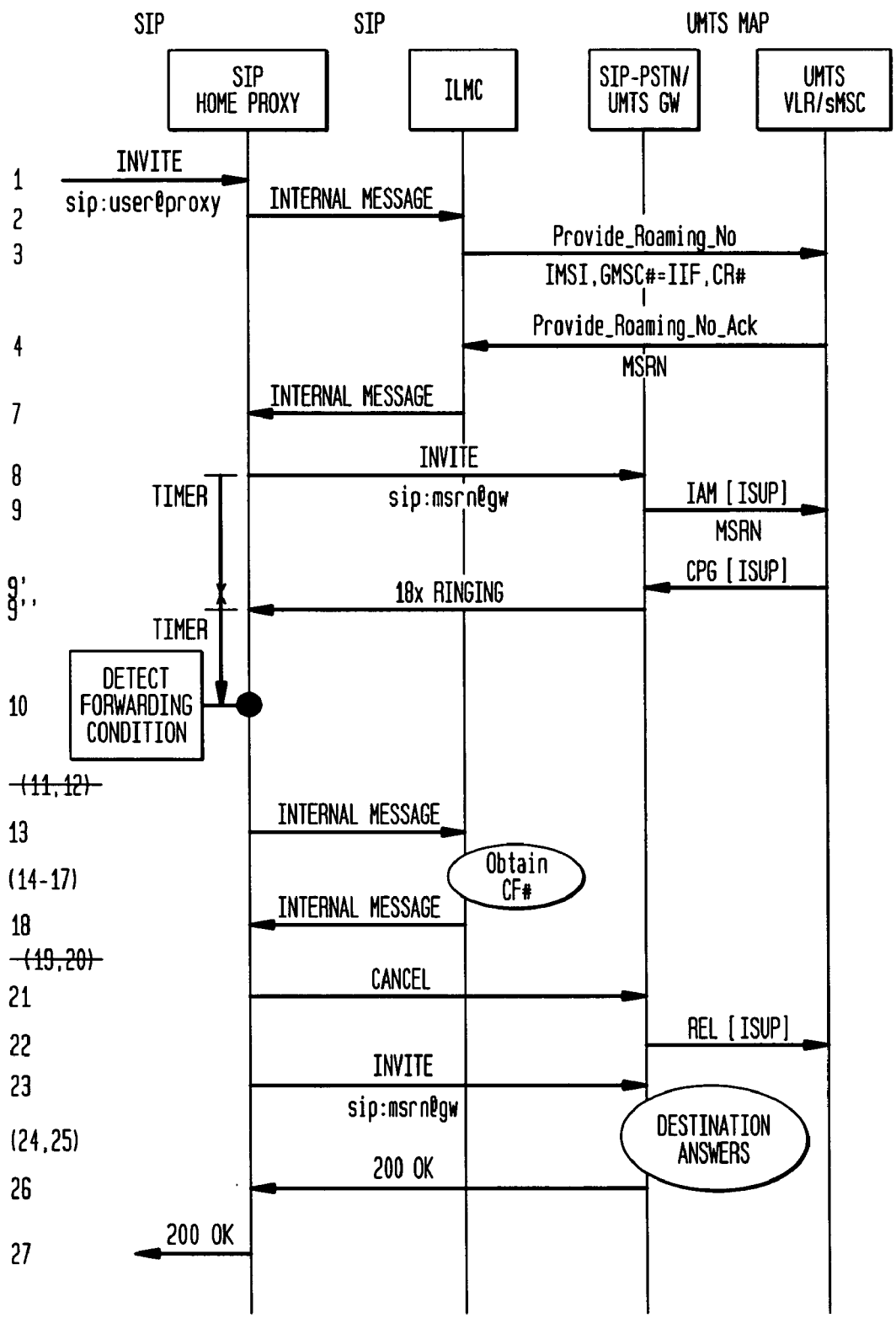
FIG. 25 is a simplified block diagram showing the case where the call is from a SIP network to a UMTS-without-OR network.

Call from SIP to UMTS-OR
See FIG. 23. This is based on the flow of FIG. 4.

Call from SIP to UMTS-without-OR
This is based on the flow of FIG. 6. See FIG. 27.

GLOSSARY

Inter-Work or Inter-Working Flow:
The inventive method and system allows two or more networks exhibiting different behaviour to interact with one another, here specifically with regard to call delivery and call forwarding. The method and system causes behaviour in one network to trigger the desired and appropriate behaviour in the other. That is the two networks inter-operate, or become capable of inter-operation.

Traditional Hard Wired Telephone Networks:

PSTN: Traditional hardwired (landline) telephone networks are called public switched telephone networks (PSTN).

Cellular Telephone Networks:

Cellular networks comprise a distributed network of geographically distributed "cell sites" within which a terminal (typically a cell phone) can operate by connecting a cell site. Cellular networks typically follow one of the current industry standards. Cellular network standards include GSM, UMTS, ANSI-41 (CDMA and CDMA-2000), and MAP.

UMTS: Universal Mobile Telecommunications System

GSM: Global System for Mobile Communication

CDMA: Code Division Multiple Access

ANSI-41 (CDMA and CDMA-2000): adheres to the International Mobile Telecommunication Standard (IMT-2000), a third generation system (3G)

HLR: A home location registrar (HLR) delivers calls, enhanced services, information, and messages to subscribers at their current locations by using network-based subscriber profile information. Subscriber data is maintained at one location for database administration when the subscriber roams to a different mobile switching center (MSC). The servicing MSC can request information from the subscriber's home MSC.

Internet Telephone Networks:

Internet based telephone networks convert telephone audio to a digital form suitable for transmission and reception over the Internet. Initially Internet terminals were primarily PC's configured with a microphone, headset, or speaker and telephony software. But, now standard telephone systems with imbedded computers can provide connections a great variety of terminals, including devices that look and serve as standard telephones.

Internet networks also typically follow one of the current industry standards. Internet based telephone networks include the SIP, H.323 network standards. Internet telephones require user and terminal information databases. The registrar in SIP, and the gatekeeper in H.323 accomplish these functions. A proxy server in SIP, and a gatekeeper in H.323 perform determination of address resolution, the location of a terminal on the Internet.

SIP: Session Initiation Protocol, a protocol for establishing real time calls and conferences over the Internet.

H.323: An older, more established Internet protocol.

We claim:

1. A call forwarding method for routing a call through a plurality of different networks, the method comprising:
    assigning a first call identifier for a call received in a subscriber's home network based on the subscriber's public address;
    determining a second network where a destination point for the call may be located;
    obtaining a second call identifier for said call from the second network, wherein the second call identifier is part of a first routing information;
    obtaining an identification of a first network interface through which said call may be routed, wherein the identification of the first network interface is part of the first routing information;
    sending the first routing information from an integrated management component to the subscriber's home network, wherein the subscriber's home network extends said call from the subscriber's home network through the first network interface into the second network using the first call identifier and the second call identifier;
    receiving a message in an integrated location management component that the call is to be forwarded to a third network;
    determining a second routing information to the third network, wherein the second routing information includes identification of a second network interface through which the call may be forwarded; and
    sending from the integrated location management component the second routine information to the subscriber's home network to indicate the call is to be forwarded to the third network, wherein the call to the second network is terminated by the subscriber's home network and the call is extended from the subscriber's home network through the second network interface to the third network.

2. A method in accordance with claim 1 further including:
    storing the first call identifier in association with the second call identifier.

3. A method in accordance with claim 2 further including:
    storing the identification of the first network interface in association with the first call identifier and the second call identifier.

4. An integrated location management apparatus for use by a plurality of networks at least two of which employ different protocols for call forwarding, said integrated location management apparatus supporting inter-protocol call forwarding and comprising:
    means for obtaining a first call identifier for a call responsive to a request from a subscriber's home network;
    means for determining a second network where the subscriber may be located;
    means for obtaining a second call identifier for the call from the second network having a first call forwarding protocol;
    means for obtaining an identification of a first network interface through which the call may be routed;
    means for communicating the identification of the first network interface, the first call identifier and the second call identifier to the subscriber's home network, wherein the subscriber's home network extends the call from the subscriber's home network through the first network interface to the second network;
    means for obtaining a third call identifier from a third network and routing information to the third network responsive to an indication from the second network that the call is to be forwarded to the third network, the third network having a second and different protocol; and
    means for communicating the third call identifier and the routing information to the subscriber's home network, wherein the subscriber's home network terminates the call to the second network and the call is extended from the subscriber's home network to the third network.

5. An integrated location management apparatus in accordance with claim 4 further including:
    a database holding location information for said plurality of networks and supporting inter-operability with said different protocols for call forwarding.

6. An integrated location management apparatus in accordance with claim 5 wherein the database is further configured to store the identification of the first network interface in association with the first call identifier and the second call identifier.

7. An integrated location management apparatus in accordance with claim 4 wherein said integrated location management apparatus is configured to identify itself as an origin of the call to the second network in order to obtain the second call identifier.

8. The method of claim 1 further comprising:
    obtaining a third call identifier for said call from the third network.

9. The method of claim 8 further comprising:
    storing the third call identifier with an identification of the second network interface.

10. The integrated location management apparatus of claim 4 further comprising:
    means for forwarding the call from the first network to the third network.

11. The method of claim 1 further comprising:
    obtaining a second identification of a second network interface through which the call may be routed.

12. The method of claim 11 wherein extending the call from the subscriber's home network through the second network interface directly to the third network comprises:
    obtaining a third call identifier for said call from the third network; and
    extending said call from the subscriber' home network through the second network interface directly to the third network using the first call identifier and the third call identifier.

13. A call forwarding method for routing a call through a plurality of different networks, the method comprising:
    establishing a first call path from an originating network to a first destination network under control of an integrated location management component coupled to the originating network and the first destination network;
    detecting, in the integrated location management component coupled a second destination network, a call forwarding condition to extend the call to the second destination network;
    terminating the first call path based on information received in the originating network from the integrated location management component of a call forwarding situation, wherein the first call path is terminated by the originating network; and
    establishing a second call path from the originating network directly to the second destination network, wherein the originating network is utilized to establish the call.

14. The method of claim 13 wherein the establishing a first call path step comprises:
- receiving a call in the originating network based on the subscriber's public address;
- assigning a first call identifier for said call associated with the originating network;
- determining the first destination network where the subscriber may be located;
- obtaining a second call identifier for said call associated with the first destination network;
- determining a first call gateway through which said call may be routed; and
- extending said call from the originating network through the first call gateway to the first destination network using the first call identifier and the second call identifier.

15. The method of claim 13 wherein the detecting step comprises:
- receiving a message in the integrated location management component that the call is to be forwarded to the second destination network.

16. The method of claim 13 wherein the establishing a second call path step comprises:
- obtaining a third call identifier for said call associated with the second destination network;
- determining a second call gateway through which said call may be routed; and
- extending said call from the originating network through the second call gateway to the second destination network using the first call identifier and the third call identifier.

* * * * *